United States Patent [19]

Iizuka

[11] Patent Number: 5,262,899
[45] Date of Patent: Nov. 16, 1993

[54] OPTICAL APPARATUS HAVING A MOUNT

[75] Inventor: Toshimi Iizuka, Yokohama, Japan

[73] Assignee: Canon Kabushiki Kaisha, Tokyo, Japan

[21] Appl. No.: 573,556

[22] Filed: Aug. 24, 1990

[30] Foreign Application Priority Data

| Aug. 25, 1989 | [JP] | Japan | 1-219767 |
| Jan. 30, 1990 | [JP] | Japan | 2-019754 |
| Feb. 2, 1990 | [JP] | Japan | 2-023783 |
| Feb. 2, 1990 | [JP] | Japan | 2-023785 |
| Jun. 29, 1990 | [JP] | Japan | 2-173206 |
| Jun. 29, 1990 | [JP] | Japan | 2-173207 |
| Jun. 29, 1990 | [JP] | Japan | 2-173208 |

[51] Int. Cl.$^5$ .............................................. G02B 7/02
[52] U.S. Cl. ................................... 359/811; 359/819; 359/828
[58] Field of Search ............... 350/251, 252, 255, 257, 350/429, 430, 247, 321; 354/286, 488, 406, 288; 425/564–566, 570, 571; 359/811–830, 871, 892, 500; 264/275, 73, 74, 79, 219–227, 237, 247–254, DIG. 69, 70

[56] References Cited

U.S. PATENT DOCUMENTS

| 3,773,405 | 11/1973 | Sugano | 350/252 |
| 3,971,841 | 7/1976 | Rubinstein | 264/275 |
| 4,239,364 | 12/1980 | Doi | 350/252 |
| 4,478,492 | 10/1984 | Ando | 350/252 |
| 4,659,203 | 4/1987 | Niwa et al. | 354/286 |
| 4,660,953 | 4/1987 | Fuchi et al. | 354/286 |
| 4,662,735 | 5/1987 | Karasaki et al. | 354/406 |
| 4,690,505 | 9/1987 | Iizuka et al. | 350/247 |
| 4,737,017 | 4/1988 | Nagasaka | 359/819 |
| 4,766,453 | 8/1988 | Shiokawa et al. | 354/286 |
| 4,822,138 | 4/1989 | Takase | 350/252 |
| 4,826,424 | 5/1989 | Arai et al. | 350/255 |
| 5,066,103 | 11/1991 | Kodaka et al. | 359/819 |

FOREIGN PATENT DOCUMENTS 6913 1/1990 Japan ................................. 359/822

OTHER PUBLICATIONS

Patent Abstracts of Japan, vol. 8, No. 137 (P-282) [1574] Jun. 26, 1984 (One page).
Patent Abstracts of Japan, vol. 8, No. 169 (P-292) [1606] Aug. 4, 1984 (One page).

Primary Examiner—Bruce Y. Arnold
Assistant Examiner—Thong Nguyen
Attorney, Agent, or Firm—Robin, Blecker, Daley & Driscoll

[57] ABSTRACT

An optical apparatus having a mount molded of plastic comprises a mount sliding surface formed on the mount and providing a fiducial surface in the direction of the optic axis, and a depression formed in the area of a parting line during molding on the mount sliding surface.

35 Claims, 23 Drawing Sheets 5,262,899

OPTICAL APPARATUS HAVING A MOUNT

BACKGROUND OF THE INVENTION

1. Field of the Invention

This invention relates to an optical apparatus having a mount molded of plastic.

2. Related Background Art

Heretofore, mounts for optical apparatuses such as camera bodies, interchangeable lenses, intermediate tubes and various converters have been made by cutting and machining a metallic material.

On the other hand, it has been proposed in Japanese Laid-Open Utility Model Application No. 55-138628 to mold a mount of plastic for an optical apparatus for an interchangeable lens. According to this, a mount for an optical apparatus can be provided inexpensively.

As a practical matter, however, it has been difficult for the following reasons to use a mount for an optical apparatus molded of plastic as a product:

(1) If a material with excellent sliding capability is used with importance attached to the operability of mounting or dismounting a mount, the mechanical strength of the mount will become weak and the mount will be readily damaged when a force is applied to a lens barrel or the like. Also, if too large a quantity of a reinforcing material such as glass fiber is added to increase the strength of plastic, the operability of mounting or dismounting the mount will become worse.

(2) During molding, burrs are produced on the parting lines of a metal mold and if these burrs lie at a locations which are important in surface accuracy, the optical performance will become worse.

SUMMARY OF THE INVENTION

One aspect of the present invention is to provide an optical apparatus having a mount in which the production of burrs does not adversely affect the optical performance because when molding the mount of plastic, the area of the parting line of a metal mold is made into a depression.

One aspect of the present invention is that in an optical apparatus having a mount molded of plastic, a cylindrical portion extending in the direction of the optic axis is reinforced by molding the mount integrally with the optical apparatus.

One aspect of the present invention is that when molding a mount of plastic, a bridge portion is formed at and integrally with the end portion of the bayonet pawl of the mount and this bridge portion is used also as a stopper for stopping the rotation of the mount.

Other objects of the present invention will become apparently from the following detailed description.

DESCRIPTION OF THE PREFERRED EMBODIMENTS

Figure 1:
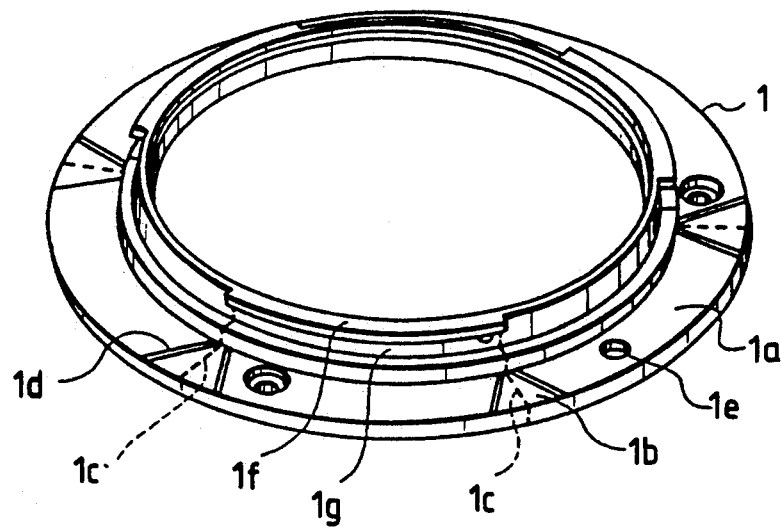
FIG. 1 is a perspective view of a lens mount as a first embodiment.
Figure 2:
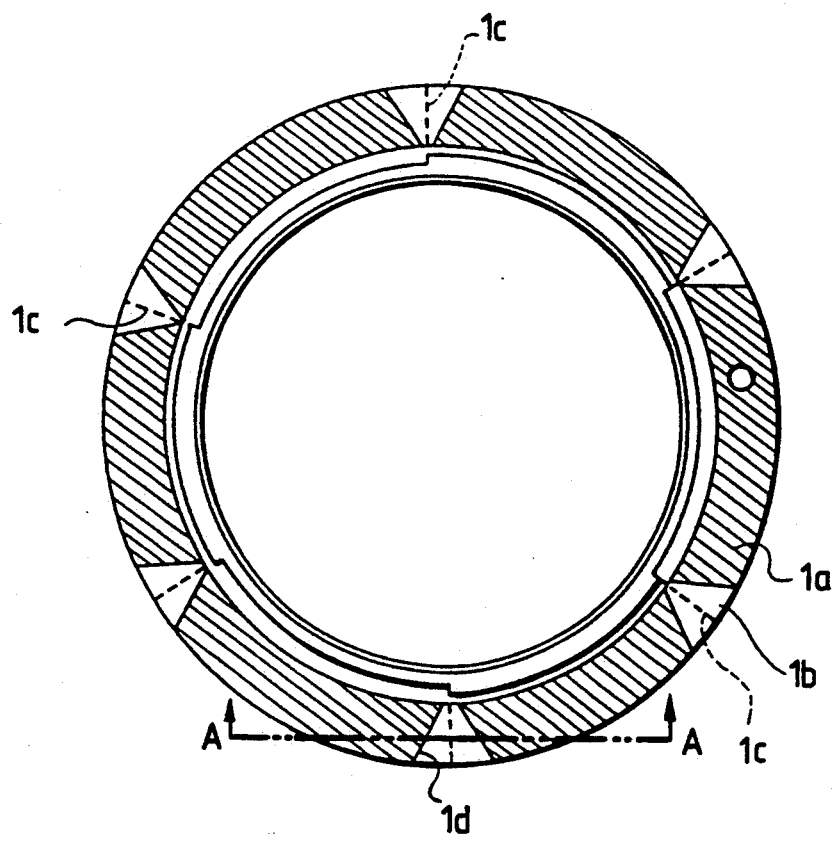
FIG. 2 is a plan view of the lens output of FIG. 1.
Figure 3:
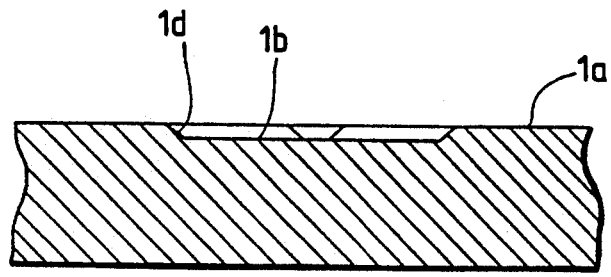
FIG. 3 is a cross-sectional view taken along line A—A of FIG. 2.

FIGS. 1 to 3 show a first embodiment of the present invention. Referring to FIG. 1 which is a perspective view of only the mount portion of an interchangeable lens, the reference numeral 1 designates a lens mount molded of plastic, the reference character 1a denotes a sliding surface (mount surface) which provides the fiducial surface of the lens mount which bears in the direction of the optic axis against the fiducial surface of a camera mount during the mounting onto a camera, the reference character 1b designates depressions slightly depressed relative to the sliding surface 1a, the reference character 1c denotes parting lines of a metal mold which are formed when the lens mount 1 is plastic-injection-molded, the reference character 1d designates inclined surfaces provided on the connecting portions (end edges) between the sliding surface 1a and the depressions 1b, the reference character 1e denotes a locking groove for effecting locking in the direction of rotation when the lens mount is mounted on the camera body, the reference character 1f designates a bayonet pawl, and the reference numeral 1g denotes a cylinder portion which is more adjacent to the center of the lens mount 1 than the bayonet 1f.

Referring to FIG. 2 which is a plan view of the mount shown in FIG. 1, the fiducial surface 1a is indicated by hatching so as to be readily understood.

FIG. 3 is a cross-sectional view of the cross-section along line A—A in FIG. 2 as it is seen in the direction of arrow. The reference character 1a designates the sliding surface, the reference character 1b denotes the depressions, and the reference character 1d designates the inclined surfaces.

When a mount of the construction as described above is to be plastic-injection-molded, the cylinder portion 1g which is the inner side of the bayonet pawl 1f is molded by the use of at least two molds which are of undercut structure and are generally called slide dies. Therefore, parting lines are created on the portions of the molds which are fitted to each other. In the lens mount shown in the first embodiment, there are six parting lines 1c. These parting lines are all located in the areas of the depressions. In other words, the depressions 1b are formed in the sliding surface at the locations whereat the parting lines 1c are created so that the parting lines 1c may lie at the locations more depressed than the fiducial surface.

Figure 4:
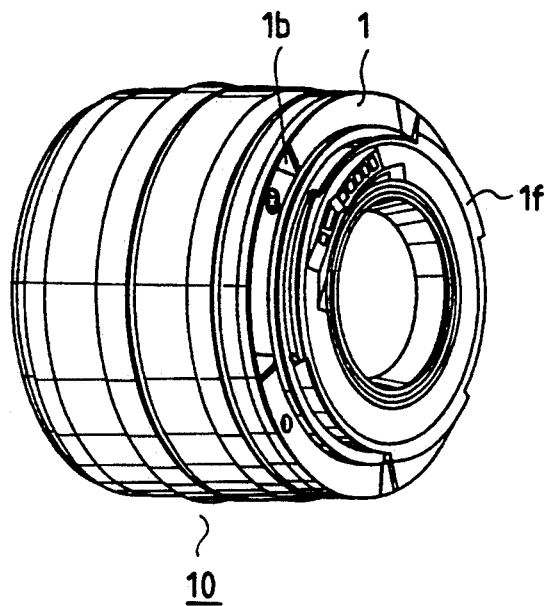
FIG. 4 is a perspective view of an interchangeable lens when the lens mount of FIG. 1 is mounted thereon.

FIG. 4 shows the lens mount 1 as it is mounted on an interchangeable lens as an accessory to the camera body.

Figure 5:
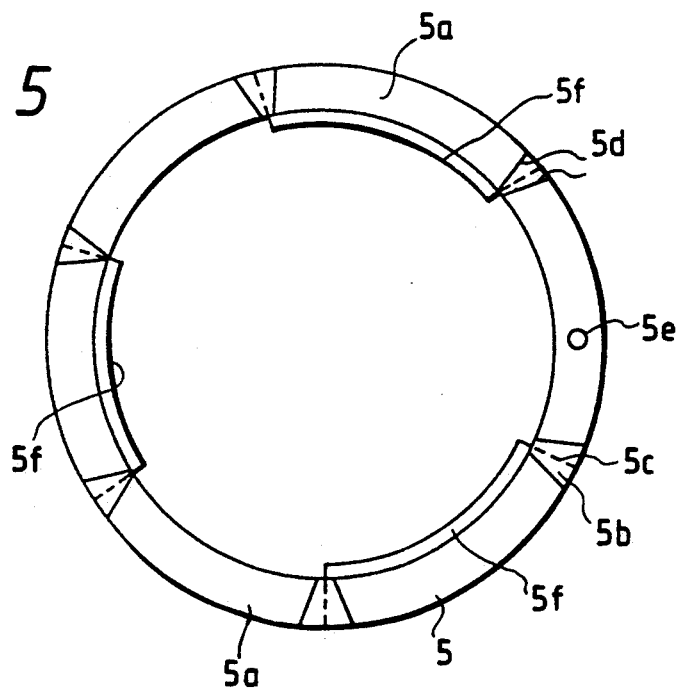
FIG. 5 is a plan view of a camera mount which performs pivoted mounting with respect to the lens mount of FIG. 1.

Referring to FIG. 5 which is a plan view of only the camera side mount, the reference numeral 5 designates a camera mount molded of plastic, the reference character 5a denotes the sliding surface (mount surface) of the camera mount 5 which slides relative to the sliding surface (fiducial surface) 1a of the lens mount during the mounting and dismounting of the interchangeable lens 10, the reference character 5b designates depressions slightly depressed relative to the sliding surface 5a, and the reference character 5c denotes the parting lines of a metal mold which are formed when the camera mount 5 is plastic-injection-molded. The parting lines 5c, as in the above-described lens mount, are made coincident with the locations of the depressions 5b. The reference character 5d designates inclined surfaces provided in the connecting portions between the sliding surface 5a and the depressions 5b, and the reference character 5e denotes a locking member for effecting locking when an accessory such as the interchangeable lens 10 is mounted. This locking member 5e is movable in the direction of the optic axis and resiliently biased and adapted to fall into the locking groove 1e upon completion of the mounting and to perform the locking function. This locking member 5e slides relative to the sliding surface 1a during the pivotal mounting and dismounting of the interchangeable lens 10 as an accessory.

Figure 6:
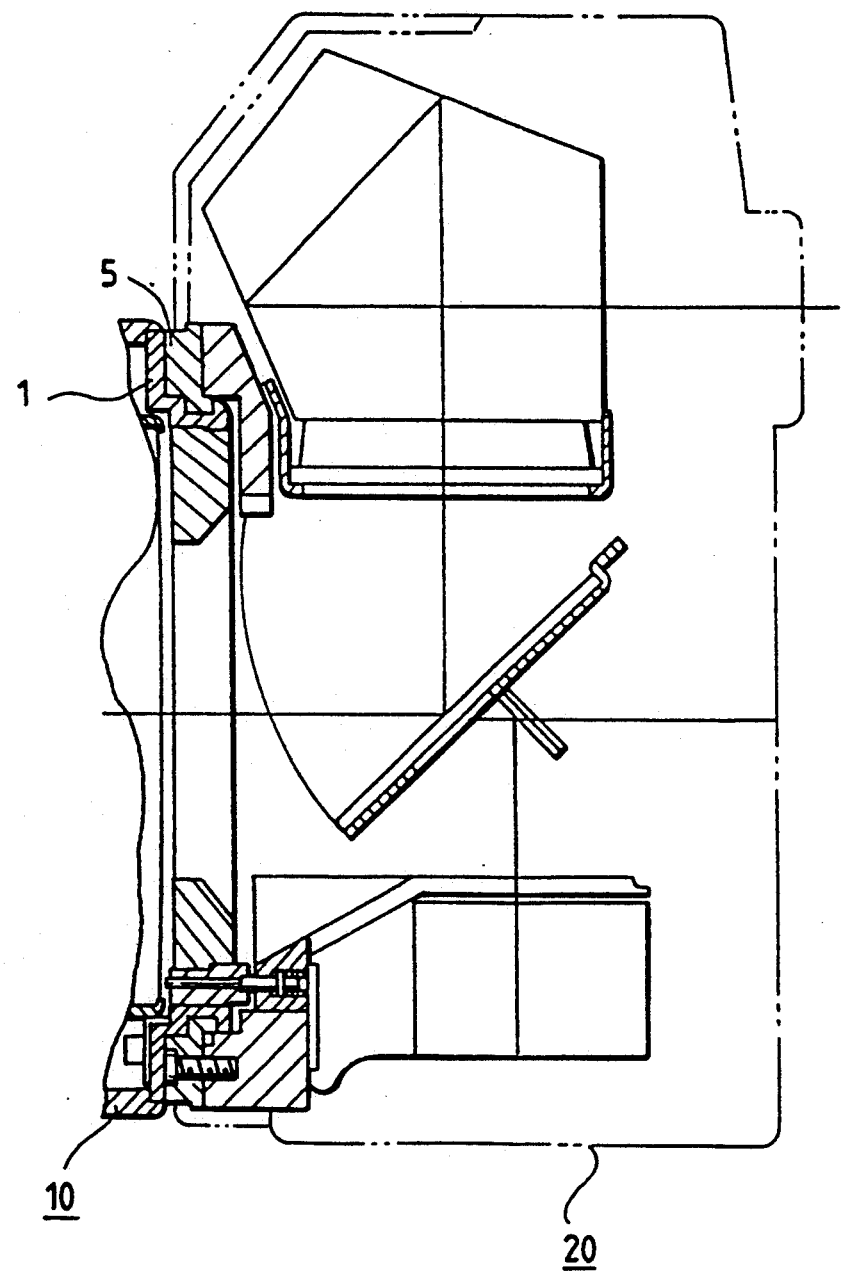
FIG. 6 is a fragmentary cross-sectional view of an interchangeable lens as it is mounted with respect to a camera body having the camera mount of FIG. 5 mounted thereon.

FIG. 6 is a fragmentary cross-sectional view of the interchangeable lens 10 as it is pivotally mounted with respect to a camera body 20 having the camera mount 5 mounted thereon.

Figure 7A:
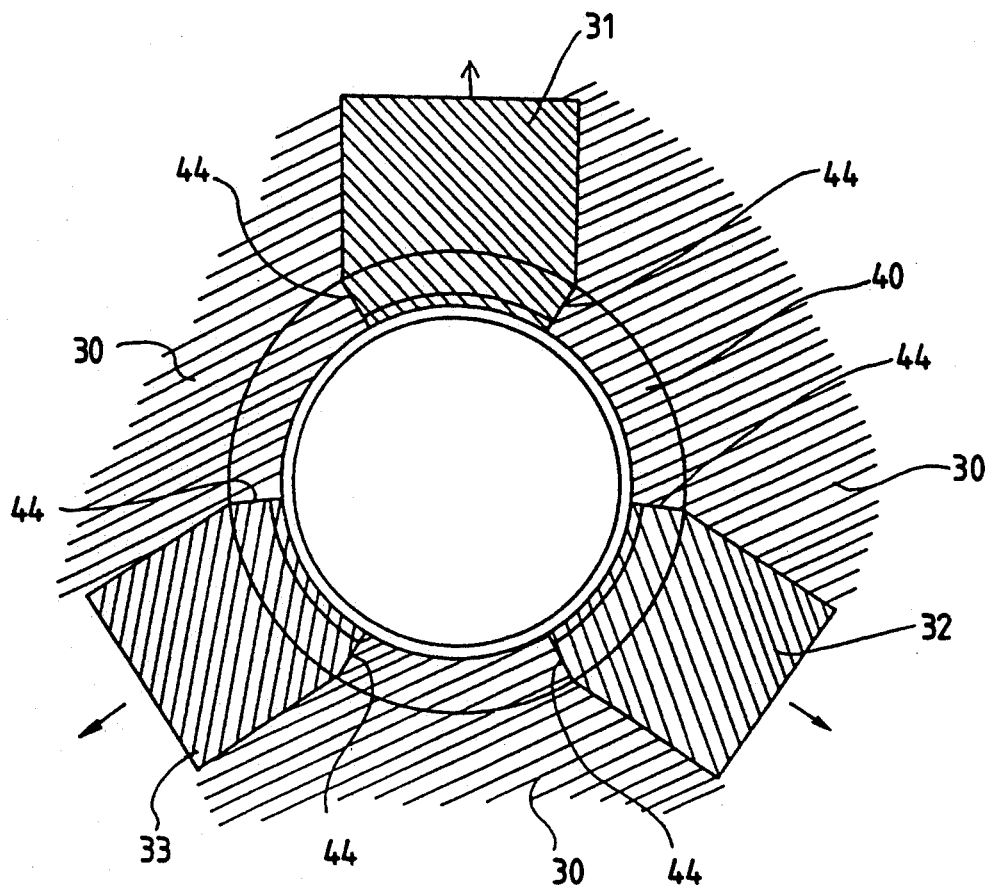
FIGS. 7A and 7B show a mold structure.
Figure 7B:
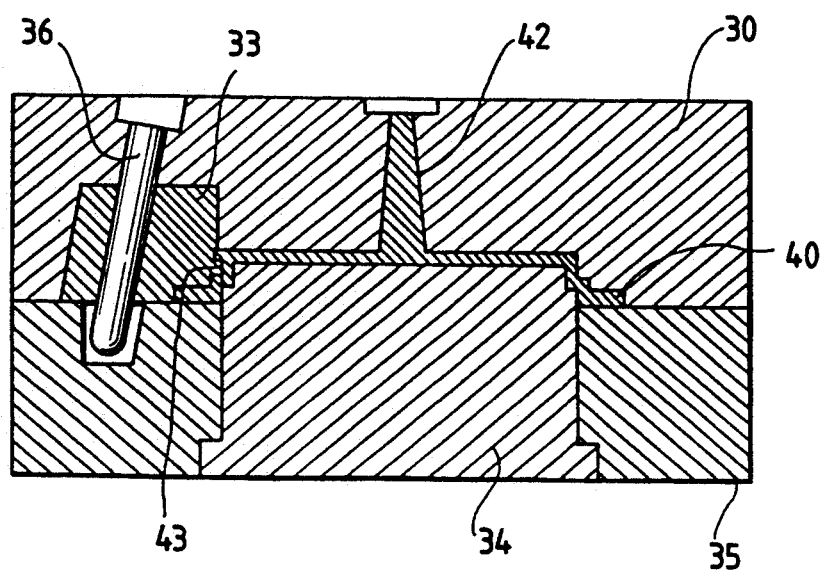

FIGS. 7A and 7B shows a mold structure when the lens mount 1 and the camera mount 5 are molded.

In FIG. 7A, the reference numeral 30 denotes a fixed side mold plate, and the reference numerals 31, 32 and 33 designate split mold blocks (slide cores) which move in the direction of arrow by the utilization of an angular pin 36 when a movable mold is opened. The reference numeral 35 denotes a movable side mold plate, and the reference numeral 36 designates an angular pin. The reference numeral 40 denotes a lens mount as a molded article. The reference numeral 42 designates a spool, and the reference numeral 43 denotes the undercut portion of the molded article.

For the molding of a molded article having the undercut portion 43, like the lens mount 1, it is necessary to use a plurality of split mold blocks (slide cores) 31-33 and consequently, for these split mold blocks 31-33, there are created a plurality of parting lines 1c in the diametrical direction in the molded article 40. That is, parting lines are created at the end edge positions of the split mold blocks 31-33.

Figure 8:
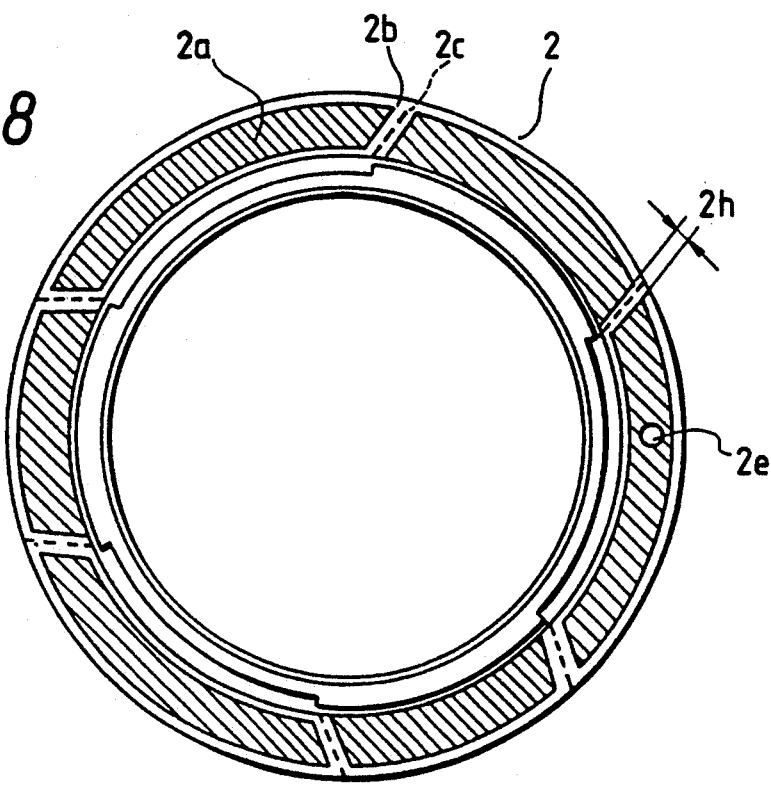
FIG. 8 is a plan view of a lens mount as a second embodiment.
Figure 9:
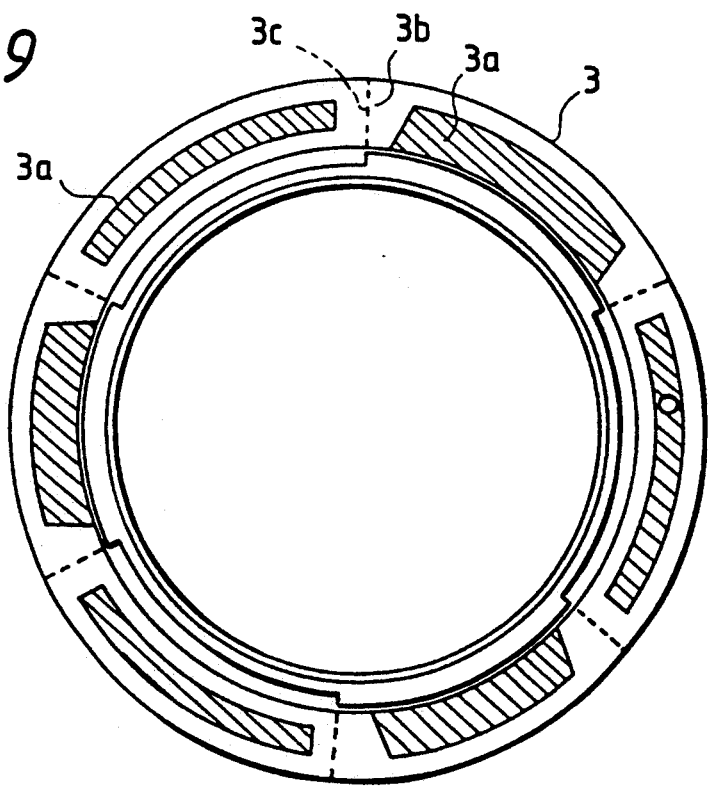
FIG. 9 is a plan view of a lens mount as a third embodiment.
Figure 10:
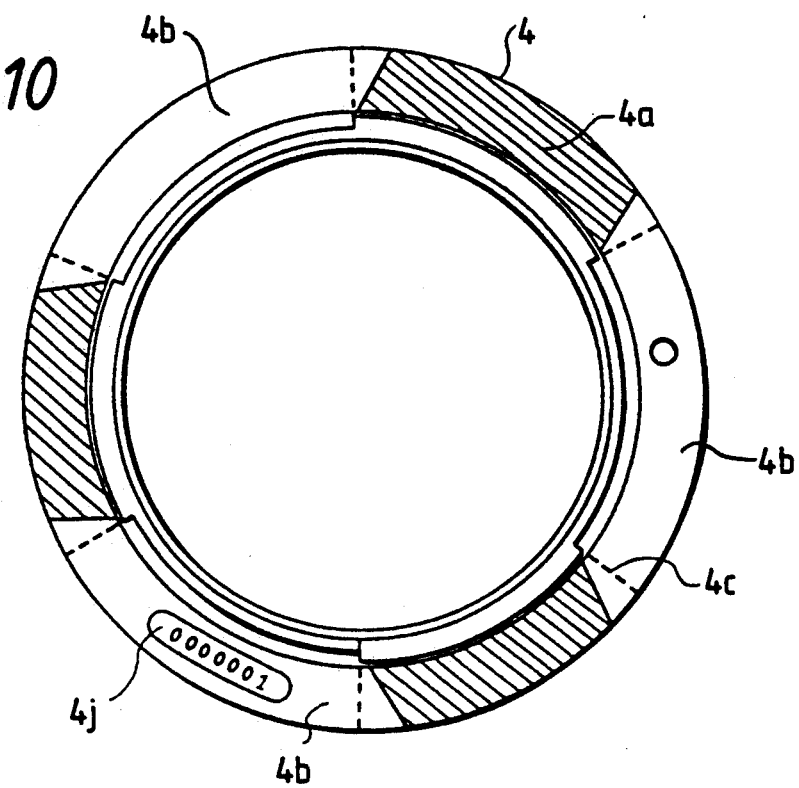
FIG. 10 is a plan view of a lens mount as a fourth embodiment.

FIGS. 8 to 10 show other embodiments. These figures are plan views of a lens mount as it is seen from the direction of the optic axis. In FIG. 8 as a second embodiment, the reference numeral 2 designates a lens mount, the reference character 2a denotes a sliding surface (fiducial surface), the reference character 2b designates depressions, the reference character 2c denotes parting lines, the reference character 2e designates a locking groove for effecting locking when the lens mount is mounted on a camera body, and the reference character 2h indicates the width of one of the depressions 2b. This width 2h is set so as to be smaller than the diameter of a locking member 5e which protrudes from a camera mount 5, fits into the locking groove 2e in the lens mount and effects the positioning of the lens in the direction of rotation. In FIG. 8 also, the sliding surface 2a is indicated by hatching so that the area thereof may be readily understood.

In FIG. 9 as a third embodiment, the reference numeral 3 designates a lens mount, the area indicated by hatching 3a is a sliding surface (fiducial surface), the reference character 3b denotes depressions, and the reference character 3c designates parting lines.

In FIG. 10 as a fourth embodiment, the reference numeral 4 denotes a lens mount, the area indicated by hatching 4a is a sliding surface (fiducial surface), the reference character 4b designates depressions, the reference character 4c denotes parting lines, and the reference character 4j designates a seal representing the manufacturing number located in the depression 4b.

As described above with reference to FIG. 1, it is requisite in the prior proposition that parting lines be present on the sliding surface of the lens mount, and usually the parting lines often provide convex burrs. In that case, there is the undesirable possibility that when the lens mount is pivotally mounted with respect to the camera mount, the interchangeable lens may not properly attach to the camera body due to the adverse effect of the burrs. According to the above-described embodiments, depressions depressed relative to the sliding surface of the lens mount are provided and the parting lines are located in the depressions, whereby the above-noted problem can be solved. Of course, the amount of depression of the depressions is set to greater than the amount of burrs in the parting lines. Also, the connecting portions between the sliding surface (fiducial surface) 1a of the lens mount and the depressions 1b are formed into the inclined surfaces 1d. When the interchangeable lens 10 is mounted on the camera body 20, the locking member 5e protruding from the camera mount 5 fits into the locking groove 1e in the lens mount while sliding on the sliding surface 1a of the lens mount to thereby effect positioning in the direction of rotation, and when the locking member 5e falls into the depression 1b at this time, it is thus easy for the locking member to come out of the depression. Also, the inclined surfaces 1d are effective from the viewpoint of beauty of the mount surface or from the viewpoint of safety because they are made so as not to be angular.

Also, by making the width 2h between the depressions smaller than the diameter of the locking member 5e as shown in FIG. 8, the locking member 5e can be prevented from falling into the depression 1a, whereby the mounting and dismounting of the interchangeable lens 10 with respect to the camera body can be performed smoothly.

Also, by forming depressions in that portion of the sliding surface which is adjacent to the diametrical direction as shown in FIGS. 8 and 9, the sliding area relative to the camera mount can be further decreased to thereby improve the operability of mounting and dismounting. Thus, even if a reinforcing material such as glass fiber is mixed with plastic to increase the mechanical strength of the mount molded of plastic, the operability of mounting and dismounting will not be spoiled. Also, the pattern of the sliding surface (fiducial surface) of the mount can be formed as desired and therefore, the beauty of the pattern and the discrimination from the conventional mount can be achieved, thus enhancing the value as an article of commerce.

Also, if the mount with foreign substances such as dust adhering to the mount surface is intactly mounted on the camera body 20, not only may the interchangeable lens 10 not be properly mounted on the camera body 20, but also the plastic sliding surface (fiducial surface) of small surface hardness may be injured.

In the present embodiment, depressions more depressed than the sliding surface (fiducial surface) are provided, whereby foreign substances such as dust adhering to the sliding surface become easy to eliminate from the sliding surface and this leads to the effect of preventing the sliding surface from being injured (the foreign substances such as dust fall into the depressions). Also, the decreased area of the sliding surface leads to a decrease in the probability that the sliding surface will be injured, and also leads to the effect that even when the sliding surface is injured, the injury is made inconspicuous.

It has been proposed to indicate a code such as the manufacturing number or product number of the lens in a depression more depressed than the sliding surface (fiducial surface) of the mount as shown in FIG. 10, but the lens mount is hidden in a camera when it is mounted on the camera and therefore, the code such as the manufacturing number which is normally unnecessary to the user of the camera can be hidden and thus, the beauty of the exterior of the lens is not spoiled.

In the above-described embodiments, only the interchangeable lens 10 has been shown as an accessory, but a similar effect can also be obtained for mounts such as various converters, bellows and intermediate tubes as other accessories.

The embodiments described above and shown in FIGS. 1 to 10 can provide a mount for an optical apparatus in which the adverse effect of burrs created in the parting lines can be eliminated even when the mount is formed of plastic. Also the adverse effect of foreign substances such as dust can be reduced by a camera body having such mount, or an optical accessory having such mount.

Figure 11:
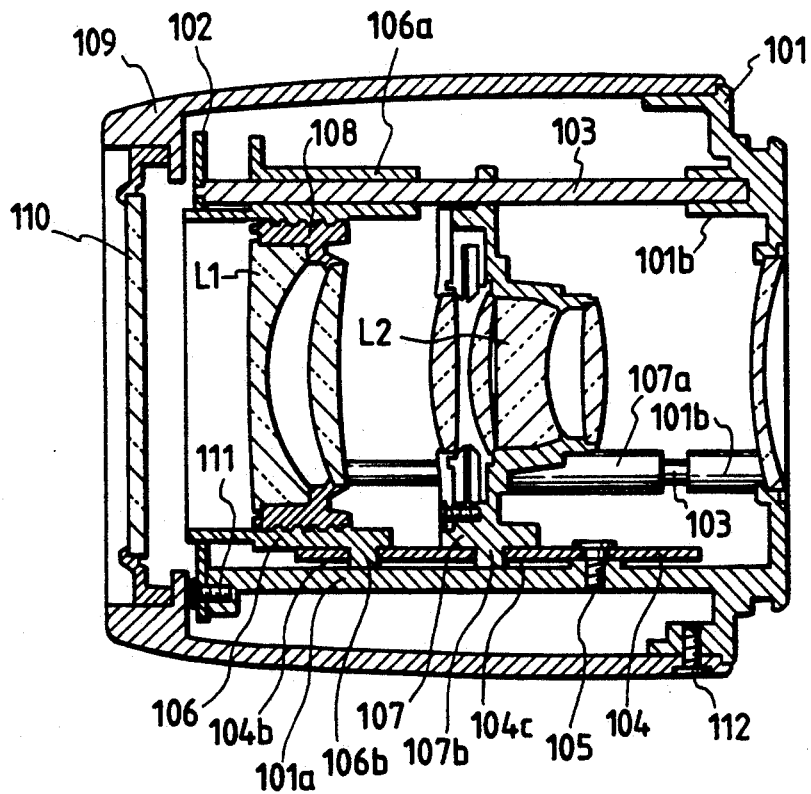
FIG. 11 is a cross-sectional view of an interchangeable lens barrel according to a fifth embodiment.
Figure 12:
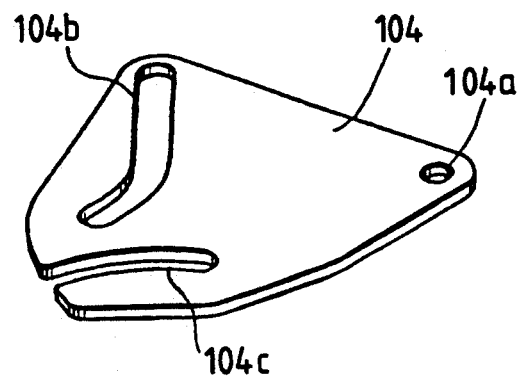
FIG. 12 is a perspective view of only the cam plate of FIG. 11.
Figure 13:
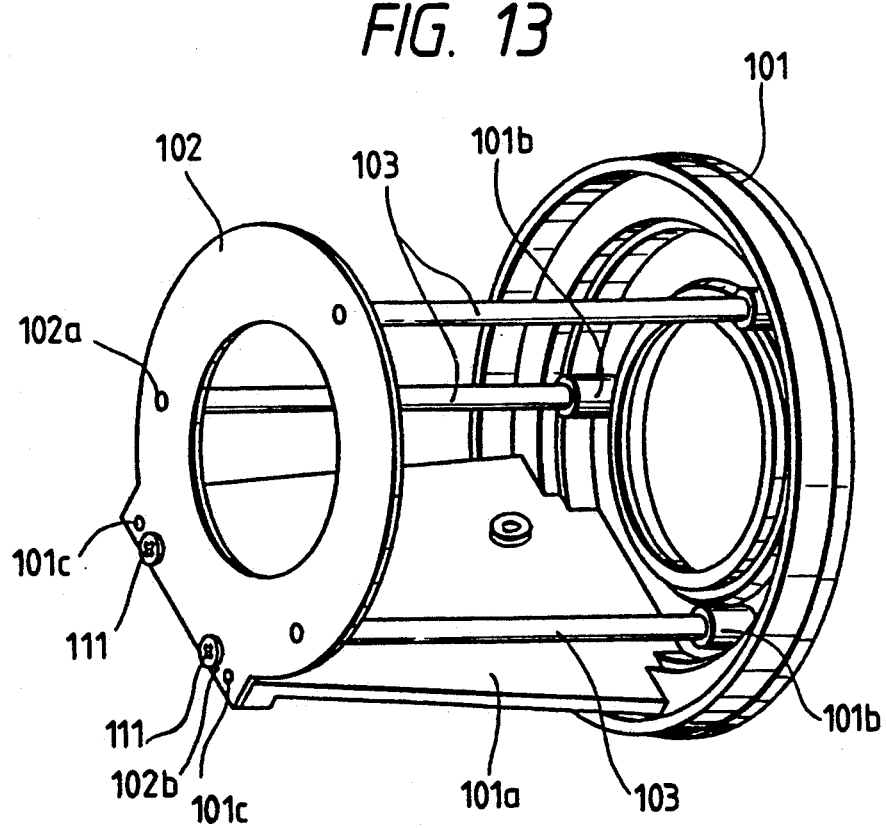
FIG. 13 is a forward perspective view of only the essential portions of FIG. 11.
Figure 14:
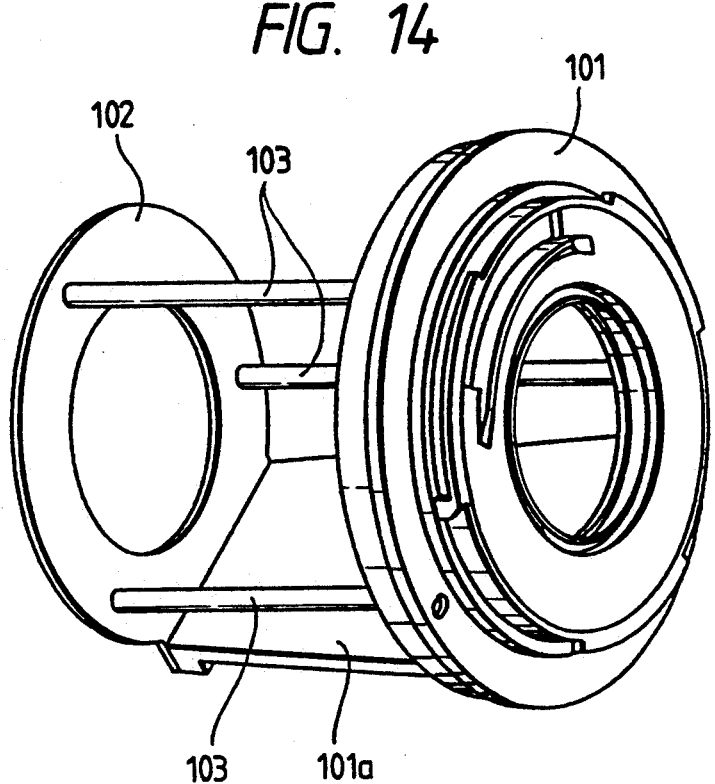
FIG. 14 is a rearward perspective view of only the essential portions of FIG. 11.

FIGS. 11 to 14 show a fifth embodiment of the present invention. FIG. 11 is a cross-sectional view containing the optic axis of an interchangeable lens barrel including a bayonet mount, FIG. 13 is a perspective view of the essential portions of the interchangeable lens barrel of FIG. 11 as they are seen from the front, FIG. 14 is a perspective view of the said essential portions as they are seen from the rear, and FIG. 12 is a perspective view of the cam plate shown in FIG. 11.

In FIGS. 11 to 14, the reference numeral 101 designates a bayonet mount made by injection molding of plastic, the reference character 101a denotes a support member molded integrally with the mount during the molding of the mount and extending in the direction of the optic axis, and the reference character 101b designates bosses which are also molded integrally with the mount during the molding of the mount and into which rods may be forced. This bosses 101b are formed with apertures into which the rods may be forced. The reference character 101c denotes a positioning projection formed at the tip end of the support member 101a. The reference numeral 102 designates a guide rod holding plate formed with apertures 102a for supporting the other ends of guide rods 103. One end of the guide rods 103 is forced into and supported by the boss 101b and the other ends are inserted in the apertures 102a in the plate 102 and supported thereby. The reference numeral 104 denotes a cam plate, the reference character 104a designates an aperture at the center of rotation of the cam plate, the reference characters 104b and 104c denote cam slots, the reference numeral 105 designates a screw for the rotary shaft of the cam plate 104, the reference numeral 106 denotes a forward group lens moving frame, the reference character 106a designates the sleeve portion of the moving frame 106, the reference character 106b denotes a cam pin integral with the moving frame 106, the reference numeral 107 designates a rearward group lens frame, the reference character 107a denotes a sleeve integral with the lens frame 107, the reference character 107b designates a cam pin integral with the lens frame 107, the reference numeral 110 denotes protective glass, and the reference numeral 111 designates a screw. L1 denotes a forward group lens, and L2 designates a rearward group lens.

In the above-described construction, one end of the guide rods 103 is firmly forced into the aperture in the boss 101b of the bayonet mount 101 so as not to come out readily. The plate 102 positioned at a proper location by the relation thereof with the aperture 102b into which the positioning projection 101c is inserted is fixed to the end portion of the support member 101a of the bayonet mount 101 by the screw 111. Also, the other ends of the guide rods 103 are fitted in and supported by the apertures 102a in the plate 102. Inserted into and supported by the central aperture 104a in the cam plate 104 is the screw 105 fixed to the support member 101a, and the cam plate 104 is rotatable about the screw 105.

The forward group moving frame 106 holding the forward group lens holding frame 108 therein by a helicoid thread is supported on the guide rod 103 for movement in the direction of the optic axis by the sleeve 106a. The rearward group lens frame 107 also has its sleeve 107a held on the guide rod 103 for movement in the direction of the optic axis. The cam pins 106b and 107b protruding from the forward group moving frame 106 and the rearward group lens frame 107 fit in the cam slots 104b and 104c, respectively, in the cam plate 104 without back-lash, and the lens frames 108 and 107 can be moved in the direction of the optic axis by the action of the cam as the cam plate 104 is rotatively moved.

Figure 15:
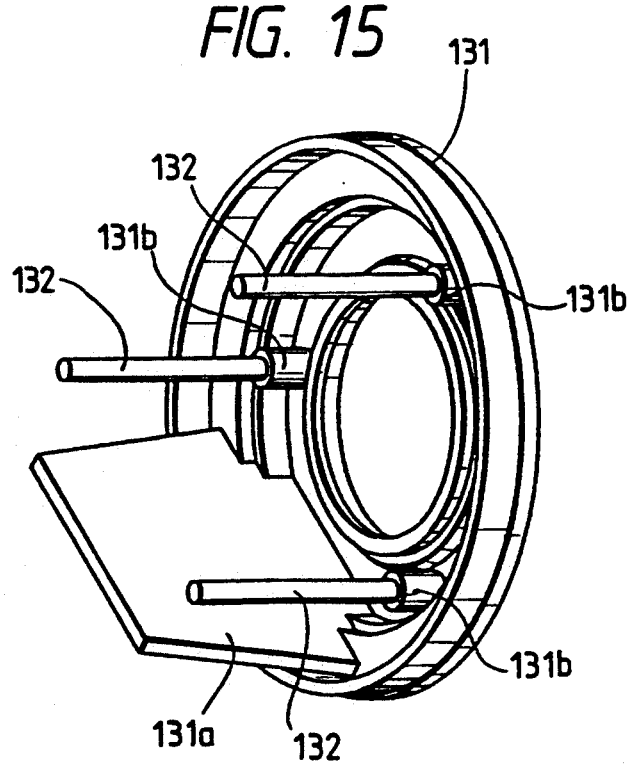
FIG. 15 is a perspective view showing the essential portions of a sixth embodiment.

FIG. 15 shows a sixth embodiment. In FIG. 15, the reference numeral 131 designates a bayonet mount, the reference character 131a denotes a support member, the reference character 131b designates bosses into which rods are forced, and the reference numeral 132 denotes guide rods.

In the present embodiment, as in the fifth embodiment, the guide rods 132 are forced into and supported by the bayonet mount 131 molded of plastic, but where the guide rods 132 are short, the plate 102 shown in the fifth embodiment is eliminated to thereby attempt to achieve further compactness and reduced cost.

As described above, in the embodiments of FIGS. 11 to 15, the bayonet mount of the interchangeable lens is molded of plastic, and one end of the guide rods which are guide members for the moving lens is forced into the bayonet mount to thereby ensure the distance between the guide rods. In the fifth embodiment, the other ends of the guide rods are supported by a plate, whereby the distance between the portions of the rods which are adjacent to the plate (the other ends) is also determined accurately. Thus, the plurality of guide rods can maintain their parallel state. Also, the plate is guided and fixed at a proper position by the positioning projection provided on the end portion of the support member for the bayonet mount, whereby the plurality of guide rods is prevented from torsion and is corrected so as to become parallel to the optic axis. As a result, it has become possible to eliminate the cylindrical fixed cylinder which has heretofore been necessary and it has also become possible to force the guide rods directly into the bayonet mount which provides the reference for mounting the mount on the camera body, without any other member serving as intermediary, thereby making the support accuracy of the moving lens group higher than before. Further, the fact that the cylindrical fixed cylinder has become unnecessary leads to the possibility of using an inexpensive cam plate in place of the conventional cylindrical cam cylinder, and this also leads to the desirable effect of compactness and reduced cost.

In the embodiments of FIGS. 11 to 15, when the mount to be mounted and dismounted with respect to the camera body is molded of plastic, the support portion for supporting the guide rods as guide members for the lens group is also molded integrally with the mount and thus, the guide rods are substantially directly supported by the mount. Accordingly, the positional accuracy of the guide rods can be made high corresponding to the mount which provides the reference of the optical position, and accurate and smooth movement of the lens group can be accomplished.

Also, by the guide rods being supported by the mount, it also becomes possible to eliminate the cylindrical fixed cylinder which has heretofore been necessary for supporting the guide rods. Thus, there can be provided a compact interchangeable lens barrel, and the elimination of the fixed cylinder further leads to the possibility of providing an interchangeable lens barrel which will not become bulky even if an inexpensive cam plate is used as a cam member.

Also, by using a support member for movably supporting said cam plate being molded integrally with said mount during the molding of said mount, there can be provided an interchangeable lens barrel which is still lower in cost and compact.

Figure 16:
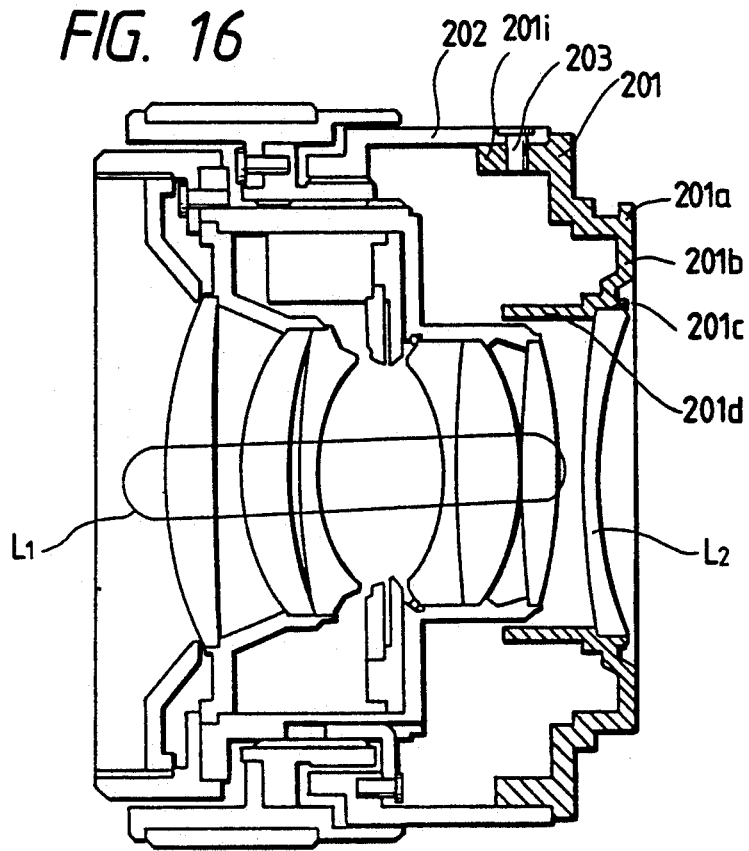
FIG. 16 is a cross-sectional view of an interchangeable lens according to a seventh embodiment.
Figure 17:
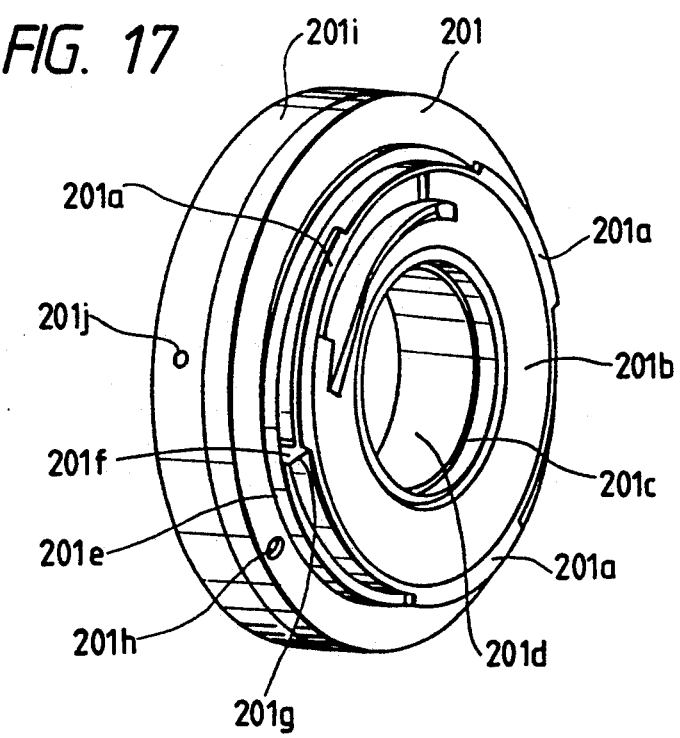
FIG. 17 is a perspective view of the mount of FIG. 16.

FIGS. 16 and 17 show a seventh embodiment of the present invention, FIG. 16 being a cross-sectional view of an interchangeable lens as an optical apparatus, and FIG. 17 being a perspective view of only a mount.

The reference numeral 201 designates a bayonet mount, the reference character 201a denotes three bayonet pawls, the reference character 201b designates the inner diametrical flange portion of the bayonet mount 201, the reference character 201c denotes a lens frame portion provided in the inner diameter of the bayonet mount 201, the reference character 201d designates a cylindrical portion extending in the direction of the optic axis from the lens frame portion 201c, L1 denotes a movable lens group, and L2 designates a fixed lens. The reference character 201e denotes a portion of the bayonet mount which is fitted to the camera side mount, and the reference character 201f designates a bridge portion for bridging the end portions of the bayonet pawls with the mount-fitted portion 201e. The location of this bridge portion has a meaning as a stopper for the camera side bayonet pawl when the bayonet mount is coupled to the camera. The reference character 201g denotes the chamfered portion (tapered portion) of the bridge 201f, the reference character 201h designates a locking groove for preventing the mount from coming off the camera when it is mounted on the camera, the reference character 201i denotes a cylinder portion, and the reference character 201j designates a screw hole formed in the cylinder portion 201i.

The reference numeral 202 denotes the fixed barrel of the interchangeable lens, and the bayonet mount 201 is fixed to the fixed barrel by a screw 203.

In FIG. 17, there is at least one bridge portion 201f, and it is most preferable that such bridge portion be provided in every bayonet pawl 201a. At least one of the bridge portions 201f serves also as a rotation stopper when the interchangeable lens is mounted on the camera body, and the chamfered portion 201g is provided as a guide for facilitating the mounting of the interchangeable lens onto the camera.

The bridge portions 201f have both the function of enhancing the mechanical strength of the bayonet pawls 201a which may decrease particularly in strength when the bayonet mount is molded of plastic and the function is as a stopper, whereby it has become possible to put this bayonet mount into practical use. Also, the chamfered portion (tapered portion) 201g can direct the camera side bayonet pawl to a predetermined position by said camera side bayonet pawl sliding with the aid of this chamfered portion 201g even if the camera side bayonet pawl more or less deviates when the interchangeable lens is coupled to the camera.

The embodiment shown in FIGS. 16 and 17 can provide an optical apparatus in which the mechanical strength of the mount, which poses a problem when the mount is molded of plastic, is improved by the bridge portions, which also function as stoppers being molded integrally with and on the end portions of the bayonet pawls. The strength of the bayonet pawls which particularly poses a problem can be improved to thereby sufficiently withstand practical use.

Figure 18:
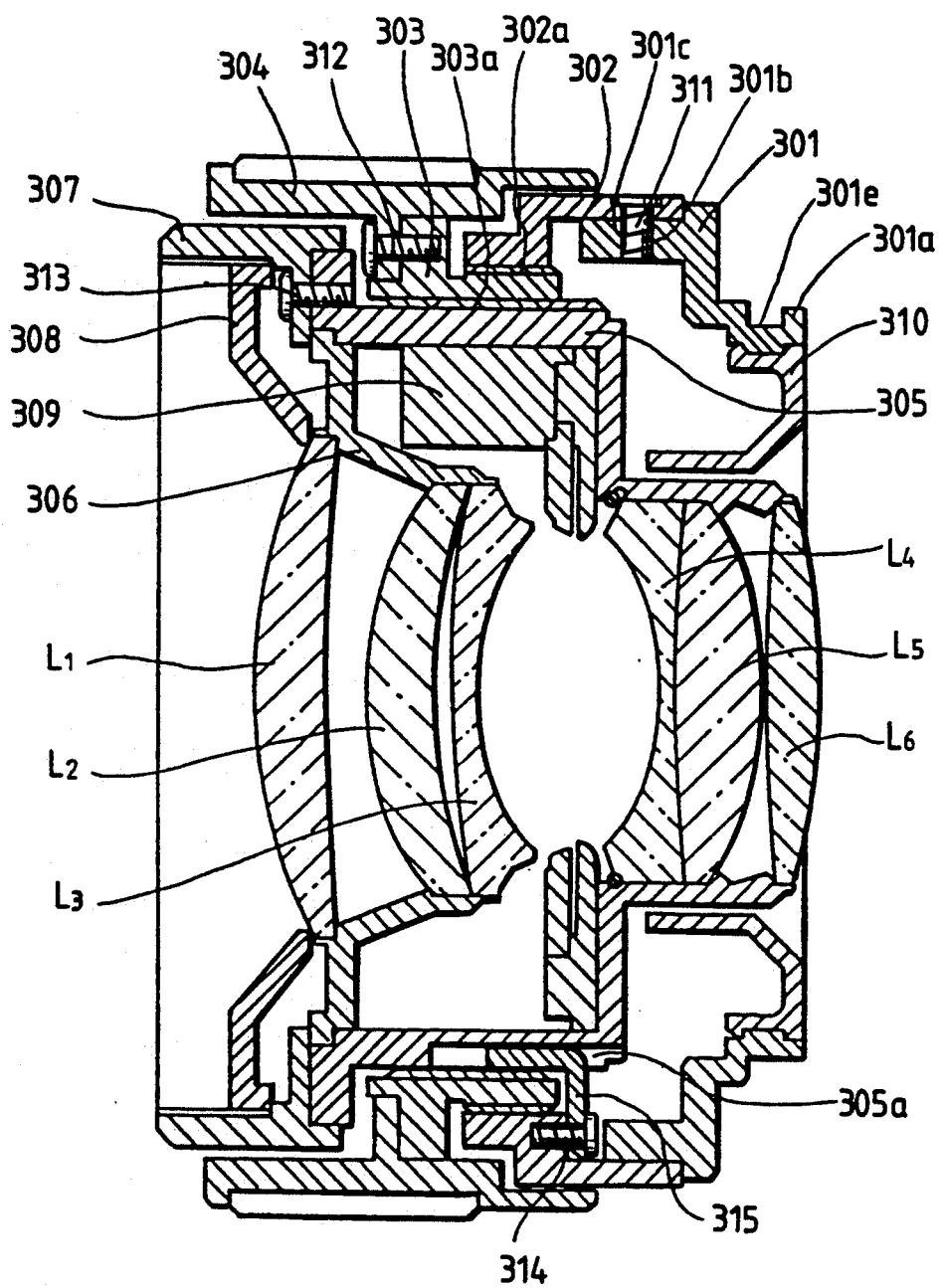
FIG. 18 is a cross-sectional view of an interchangeable lens as an eighth embodiment of the present invention.
Figure 19:
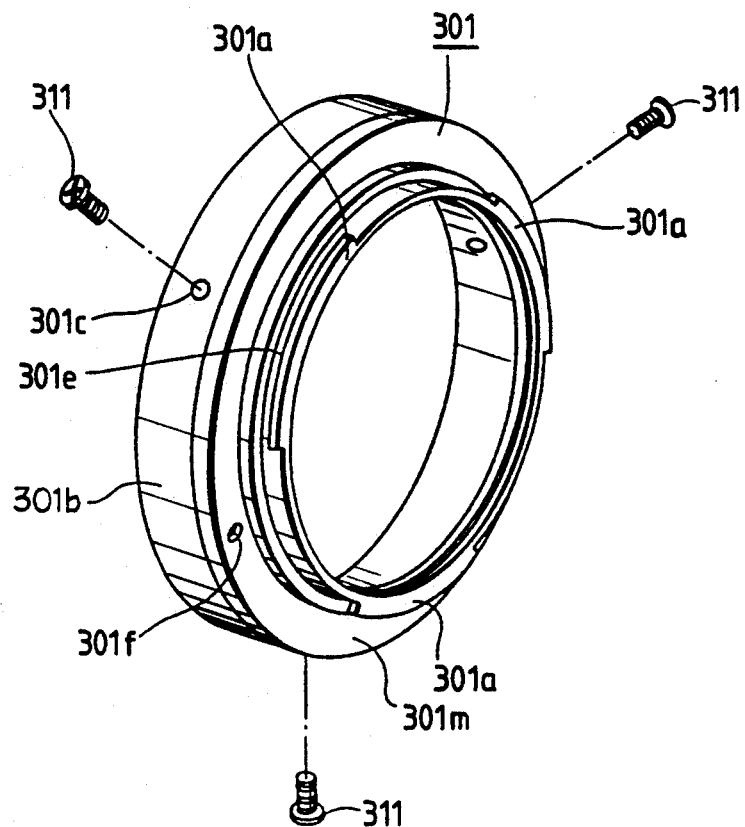
FIG. 19 is a perspective view of only the bayonet mount of FIG. 18.

FIGS. 18 and 19 show an eighth embodiment of the present invention. Referring to FIG. 18 which is a cross-sectional view of an interchangeable lens barrel as an optical apparatus, the reference numeral 301 designates a bayonet mount, the reference character 301a denotes a bayonet pawl, the reference character 301b designates a cylinder portion extending in the direction of the optic axis from the outer periphery of the bayonet mount 301, the reference character 301c denotes a mounting screw hole, the reference character 301e designates the undercut portion of the bayonet pawl 301a, the reference numeral 302 denotes the fixed barrel of the interchangeable lens barrel body portion, the reference character 302a designates a screw of small pitch, the reference numeral 303 denotes a rotatable helicoid cylinder, the reference character 303a designates a helicoid thread for axially moving the lens, the reference numeral 304 denotes an operating ring for focus adjustment, the reference numeral 305 designates a middle cylinder for holding and axially moving the lens, the reference character 305a denotes a key way provided in the direction of the optic axis of the middle cylinder 305, the reference numeral 306 designates a forward group lens barrel, the reference numeral 307 denotes a forward cylinder having a mounting portion for an accessory such as a lens cap or a filter, the reference numeral 308 designates a decorative cover on the front of the camera, the reference numeral 309 denotes an iris diaphragm device, the reference character 310 designates a decorative cover on the rear of the lens, the reference numerals 311, 312, 313 and 314 denote screws, the reference numeral 315 designates a key which provides a guide for the movement of the middle cylinder 305 in the direction of the optic axis, and L1, L2, L3, L4, L5 and L6 denote optical lenses.

Referring to FIG. 19 which is a perspective view of the bayonet mount shown in FIG. 18, the reference numeral 301 designates the mount, the reference character 301a denotes the bayonet pawl, the reference character 301b designates the cylinder portion, the reference character 301c denotes the mounting screw hole, the reference character 301d designates a rotation stopper which serves during the mounting of the mount, the reference character 301e denotes the undercut portion of the bayonet pawl 301a, the reference character 301f designates a locking groove serving both to prevent the mount from coming off and to position the mount when the mount is mounted, and the reference numeral 311 denotes the screw.

Figure 20:
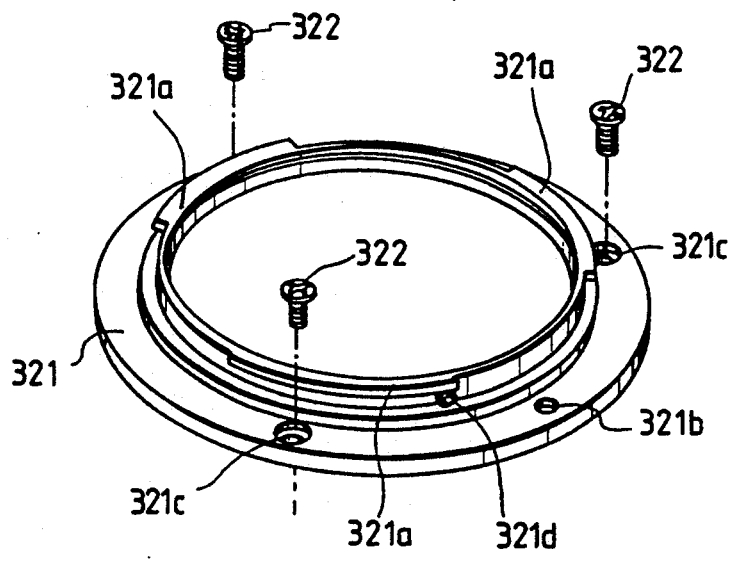
FIG. 20 is a perspective view of a conventional bayonet mounted machined and formed of a metal.

Referring to FIG. 20 which is a perspective view showing an example of the conventional bayonet mount made by cutting and machining a metal material, the reference numeral 321 designates the bayonet mount, the reference character 321a denotes bayonet pawls, the reference character 321b designates a locking groove for preventing the bayonet mount from coming off when it is mounted, the reference character 321c denotes screw holes for mounting the bayonet mount 321 on an interchangeable lens body, the reference character 321d designates a rotation stopper screw for stopping the rotation of the bayonet mount when it is mounted, and the reference numeral 322 denotes screws.

Figure 21:
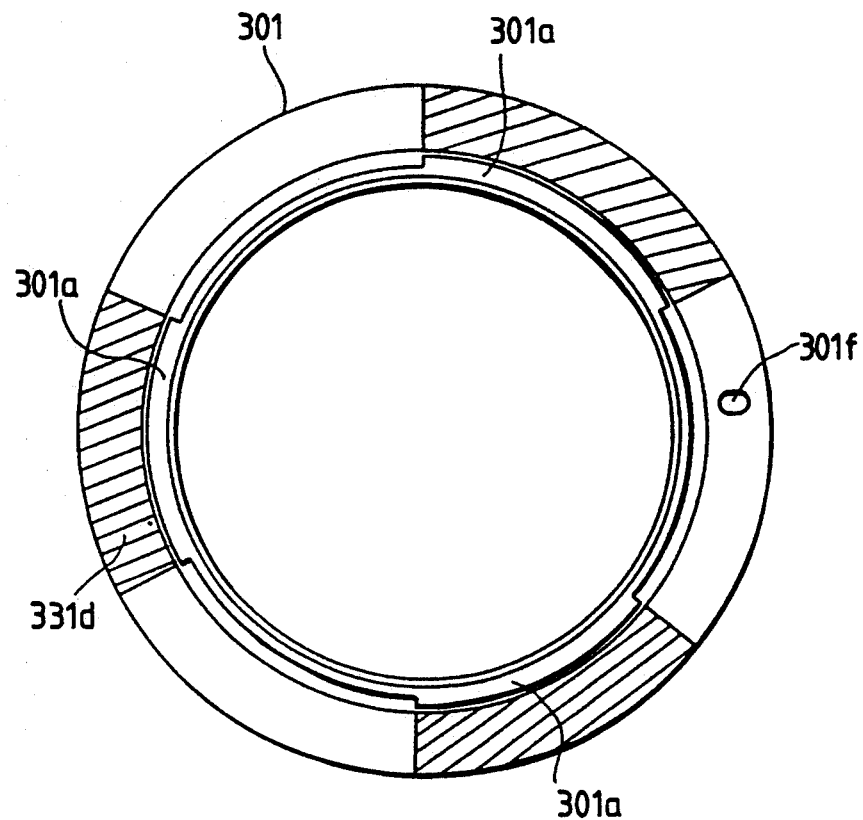
FIG. 21 is a front view of the bayonet mount as the embodiment of FIG. 19 as it is seen from the bayonet pawl side.

FIG. 21 is a view of the bayonet mount as it is seen from the direction of the optic axis on the bayonet pawl side. In FIG. 21, the portions 331d indicated by hatching show the ranges of three bayonet pawls 301a in the mounting fiducial surface which is the sliding surface of a camera as other optical apparatus relative to the camera side bayonet mount.

Figure 22:
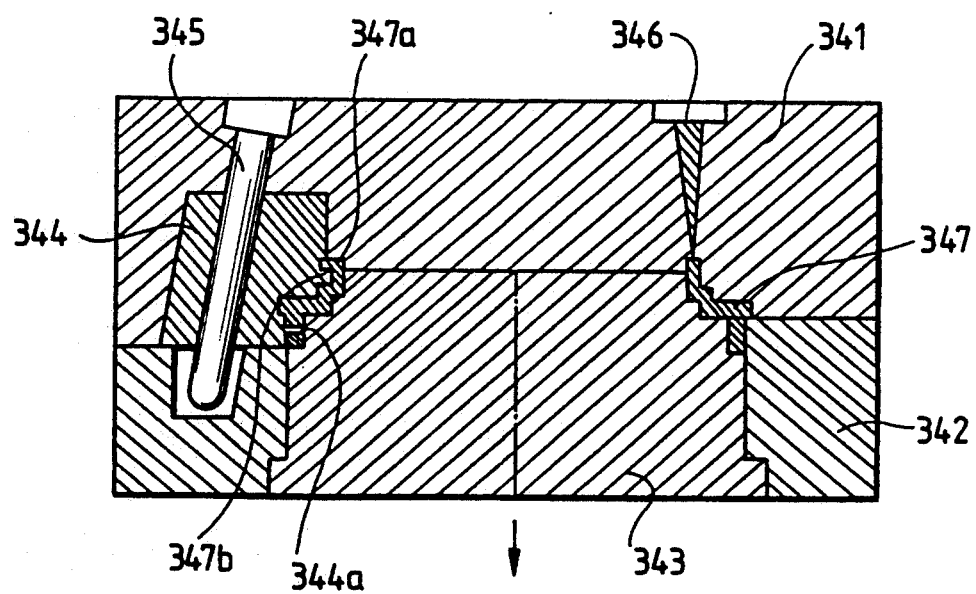
FIGS. 22 and 23 illustrated the principle of an injection molding metal mold.
Figure 23:
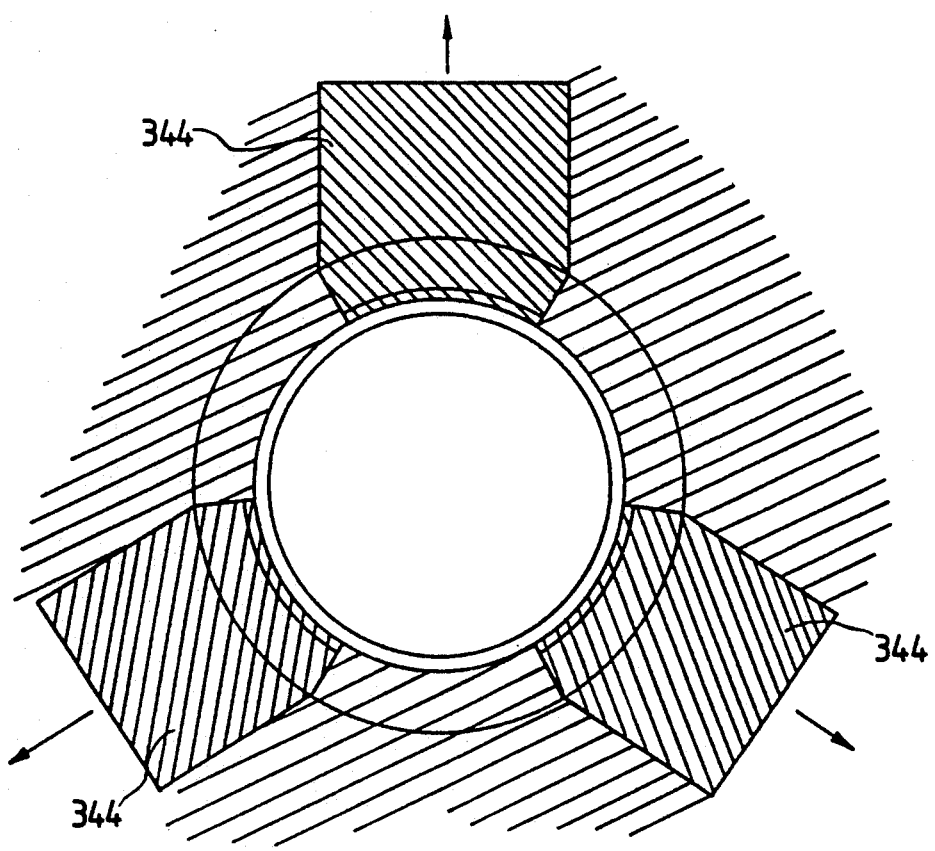

FIGS. 22 and 23 illustrate the principle of a metal mold when a bayonet mount is made by the plastic injection molding method. FIG. 22 is a cross-sectional view taken along the center of the optic axis of the mount, and FIG. 23 shows the direction of movement of a slide core as it is seen from the direction of the optic axis. The reference numeral 341 designates a fixed side mold plate, the reference numeral 342 denotes a movable side mold plate, the reference numeral 343 designates a core, the reference numeral 344 denotes slide cores, the reference character 344a designates a screw hole (formed in the same phase as a bayonet pawl), the reference numeral 345 denotes an angular pin, the reference numeral 346 designates a spool, the reference numeral 347 denotes a molded article (a bayonet mount), the reference character 347a designates a bayonet pawl, and the reference character 347b denotes the undercut portion of the molded article. By opening the movable side mold plate 342, the core 343 and the slide cores 344 in the direction of arrow, the slide cores 344 are opened in the directions of arrows in FIG. 23 with the aid of the action of the angular pin 345, whereby the mold is parted from the undercut portion 347b of the molded article shown in FIG. 22 and thus, it becomes possible to remove the molded article 347 from the mold. As can be seen from the foregoing description, with regard to the portion molded by the slide cores 344, the structure is such that the undercut portion is provided relative to the directions in which the slide cores 344 are opened. For example, the structure like the screw hole 321c in the example of the prior art shown in FIG. 20, cannot be made by the injection molding method, but is made by machining after the molding. Therefore, advantages peculiar to the injection molding method are decreased.

In the eighth embodiment described above, the cylinder portion 301b extending in the direction of the optic axis is molded integrally with the bayonet mount 301 when the latter is molded, whereby flexural rigidity could be remarkably improved as compared with the bayonet mount shown in FIG. 20 wherein the conventional metallic mount was made into a plastic mount, and it was made possible to actually make a product. Also, the fixing of the bayonet mount 301 to the apparatus body is effected by a structure in which the diametrical screw hole 301c is formed in the cylinder portion 301b and the bayonet mount is screw-set by the screw 311 and thus, the screw hole 301c can be formed without complicating the method of molding the bayonet mount 301. Further, by this screw hole 301c being positioned within the phase of the bayonet pawl 301a (within the range of the angle of the bayonet pawl 301a about the optic axis), the deformation of the bayonet pawl which particularly posed a problem of flexure could be minimized. Also, the cylinder portion 301b was formed substantially at an outer peripheral position of the bayonet mount 301 and therefore, particularly the strength of the sliding surface 301m of the mount could be enhanced and the positional accuracy of the sliding surface 301m of the mount which provides the optical fiducial surface could be improved.

Figure 24:
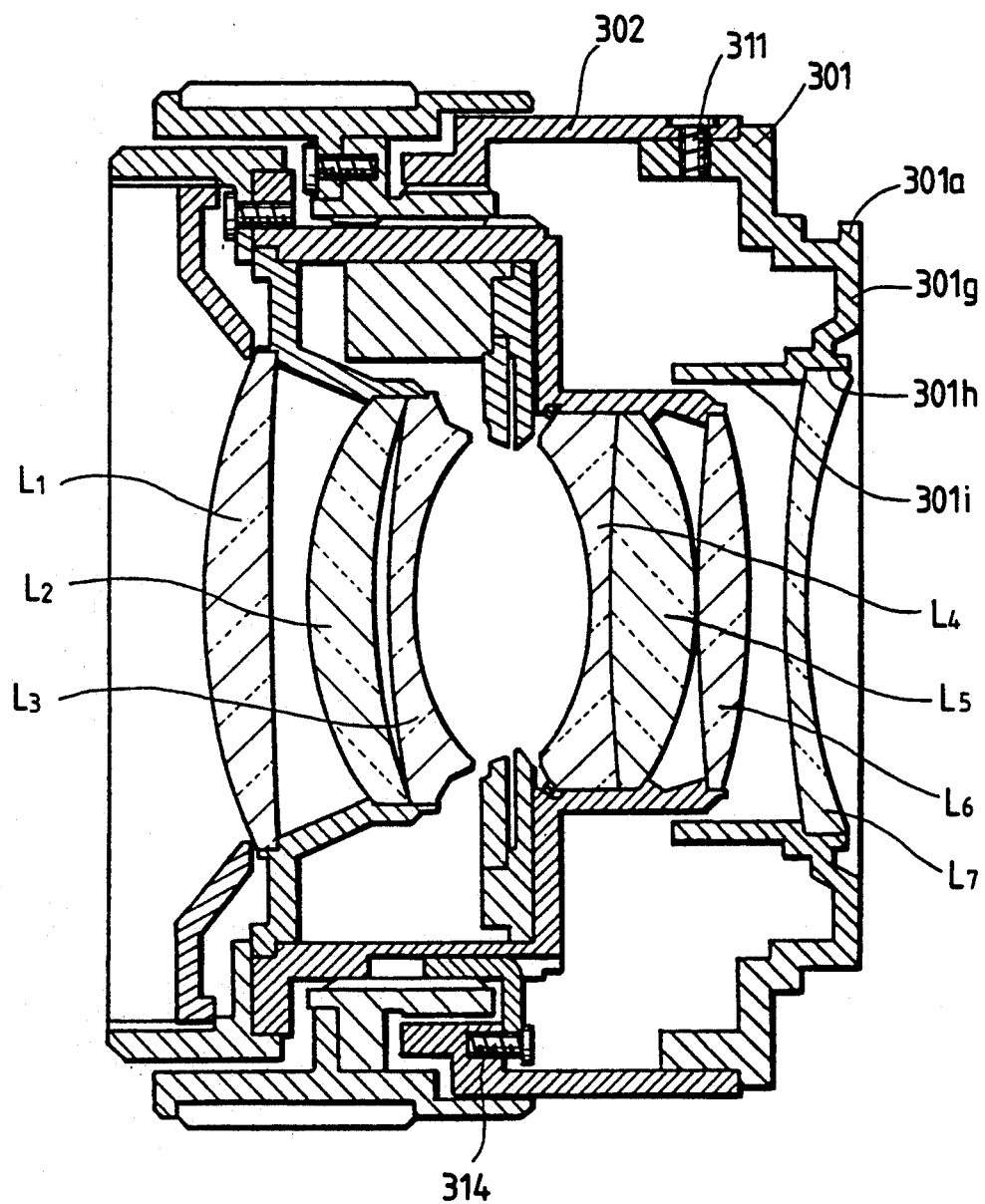
FIG. 24 is a cross-sectional view of an interchangeable lens as a ninth embodiment.

A ninth embodiment will now be described with reference to FIG. 24.

The ninth embodiment is such that a flange portion 301g, a lens frame portion 301h and a second cylindrical portion 301i are molded integrally with a bayonet mount 301 when the latter is molded of plastic.

Figure 25:
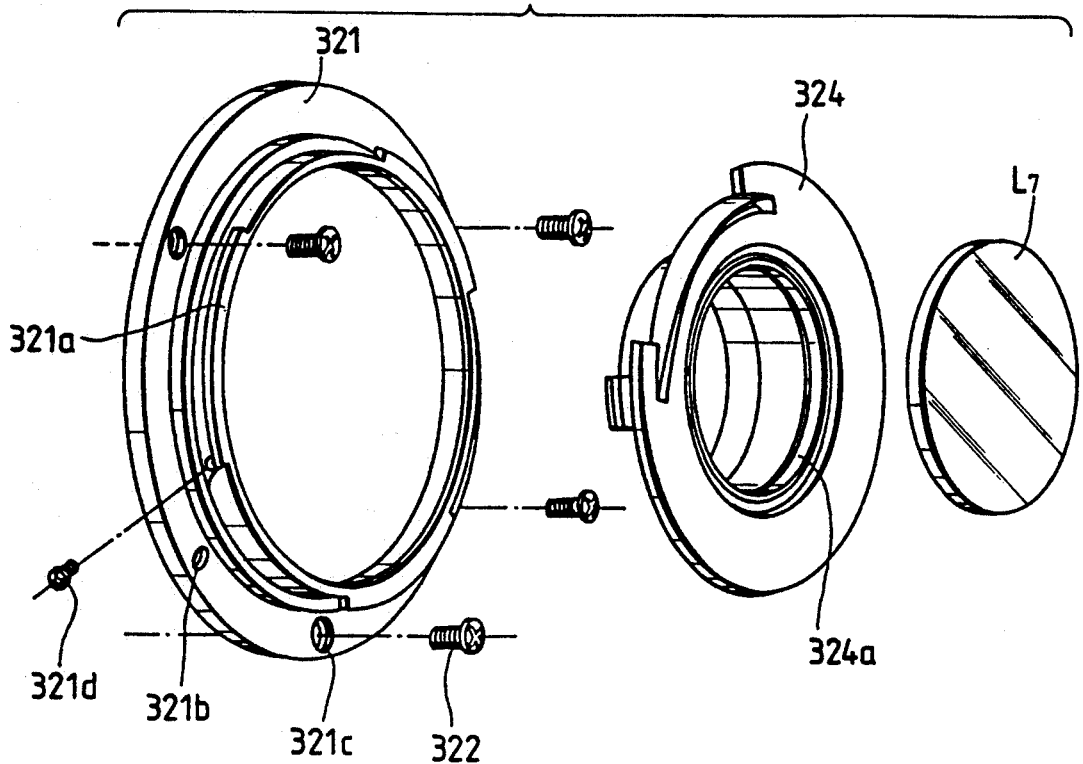
FIG. 25 is a perspective view showing the surroundings of a conventional bayonet mount machined and formed of a metal.

The flange portion 301g and the lens frame portion 301h play the role of a fixed lens holding barrel 324 which serves also as the conventional decorative cover for the mount shown in FIG. 25, and an optical lens L7 is directly fixed to the lens frame portion 301h.

The second cylindrical portion 301i is useful to further enhance the mechanical strength of the bayonet mount 301, and serves also as a light intercepting cylinder.

As described above, in the embodiments shown in FIGS. 18 to 24, a cylindrical portion extending in the direction of the optic axis of the mount of an optical apparatus is provided integrally with the mount to make up for the insufficient strength which is a weak point of plastic when the mount is molded of a plastic material, whereby the rigidity of the mount portion is enhanced to thereby make it practically usable.

Also, the screw for fixing the mount is set diametrically at the location of said cylindrical portion and further, the screw setting position is made coincident with the phase of the bayonet pawl and therefore, inexpensive manufacture of the mount is made possible without complicating the mold structure during the molding of the mount and furthermore, the mount can be held through the bayonet pawl without being deformed when an extraneous force is applied thereto.

Still furthermore, the optical lens is held by the utilization of the cylindrical portion for improving the strength of the mount, whereby there can be provided an optical apparatus in which the number of parts can be greatly decreased.

Figure 26:
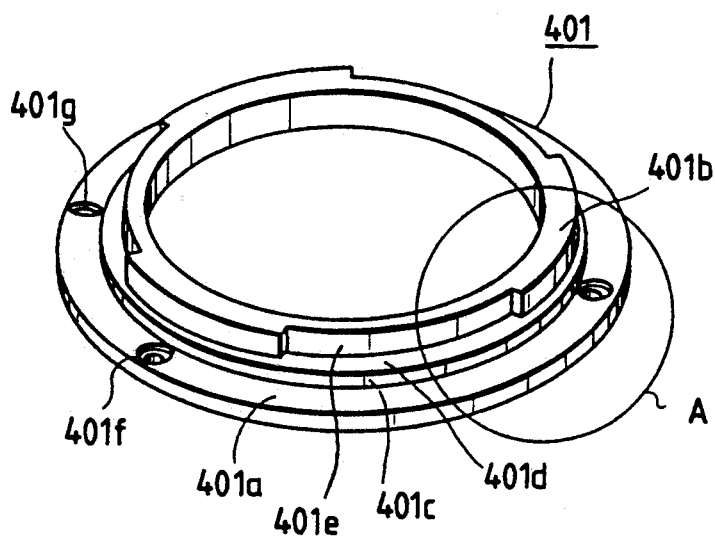
FIG. 26 is a perspective view of only a lens mount as a tenth embodiment.
Figure 27:
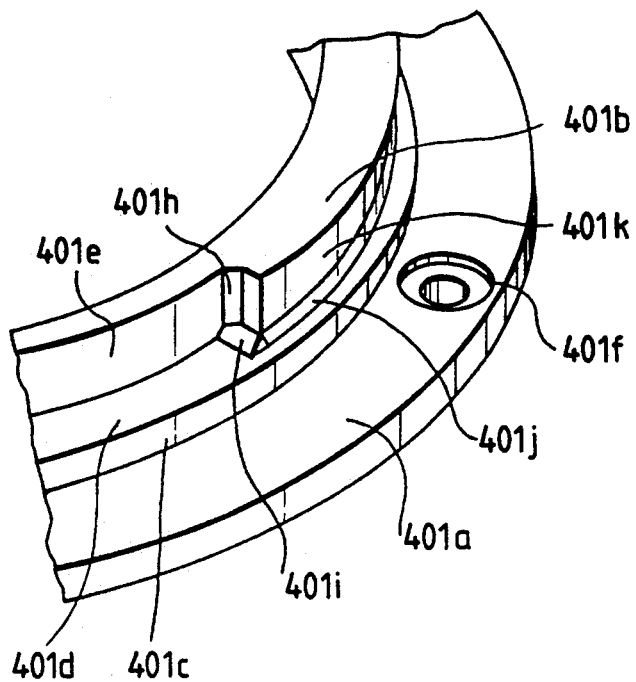
FIG. 27 is an enlarged view of the portion A of FIG. 26.
Figure 28:
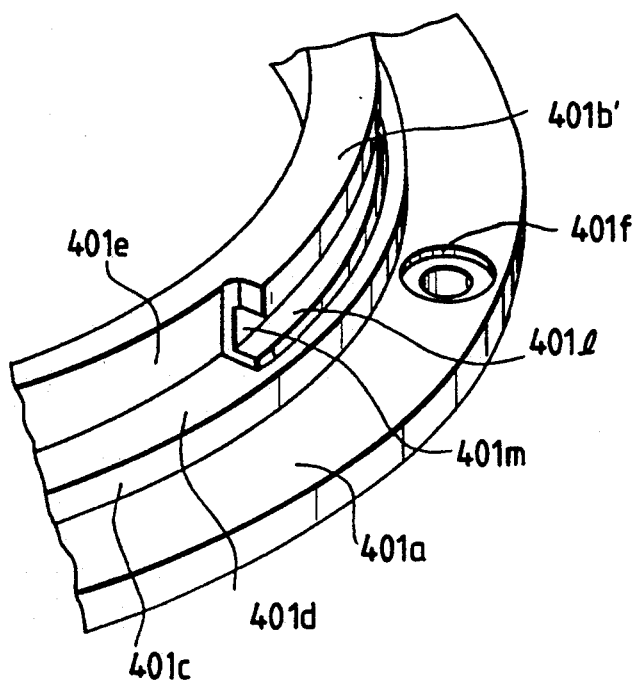
FIG. 28 is an enlarged view of the portion A of FIG. 26 after being cut.

FIGS. 26 to 28 show a tenth embodiment of the present invention. FIG. 26 shows the state of a lens mount of the bayonet type after it has been molded. FIG. 27 is an enlarged view of the portion A (the mount pawl portion) of the mount shown in FIG. 26. FIG. 28 is an enlarged detailed view of the portion A of FIG. 26 in a state in which the mount pawl portion shown in FIG. 26 has been circumferentially lathe-machined to thereby finish a bayonet pawl. In FIG. 26, the reference numeral 401 designates a lens mount of the bayonet type, the reference character 401a denotes a mount sliding surface which slidably contacts with the partner side mount during the mounting and dismounting thereof and which provides the fiducial surface in the direction of the optic axis for mounting, the reference character 401b designates a bayonet pawl portion which provides a bayonet pawl after finished, the reference character 401c denotes a level-difference-like fitting surface which provides a diametrical fiducial surface for ensuring the coaxiality of an optical apparatus with respect to the partner side mount, the reference character 401d designates a level difference surface, the reference character 401e denotes a cylinder portion which provides an introduction portion for the bayonet pawl portion of the partner side mount, the reference character 401f designates a screw fastening hole for fixing the lens mount to a lens body, and the reference character 401g denotes a groove for effecting the positioning in the direction of rotation when the lens amount is mounted on the partner side mount.

In FIG. 27, the reference character 401h designates an inclined surface provided in a portion wherein the bayonet pawl portion 401b and the cylinder portion 401e intersect each other, the reference character 401k denotes an idle wall portion adapted to be scraped off by lathe-machining, and the reference characters 401i and 401j designate inclined surfaces provided in a portion wherein the idle wall portion 401k and the level difference surface 401d intersect each other.

FIG. 28 shows a state in which the idle wall portion 401k shown in FIG. 27 has been cut by lathe-machining to thereby finish a bayonet pawl 401b'. The reference characters 401l and 401m designate the machined surfaces by lathe-machining.

Figure 29:
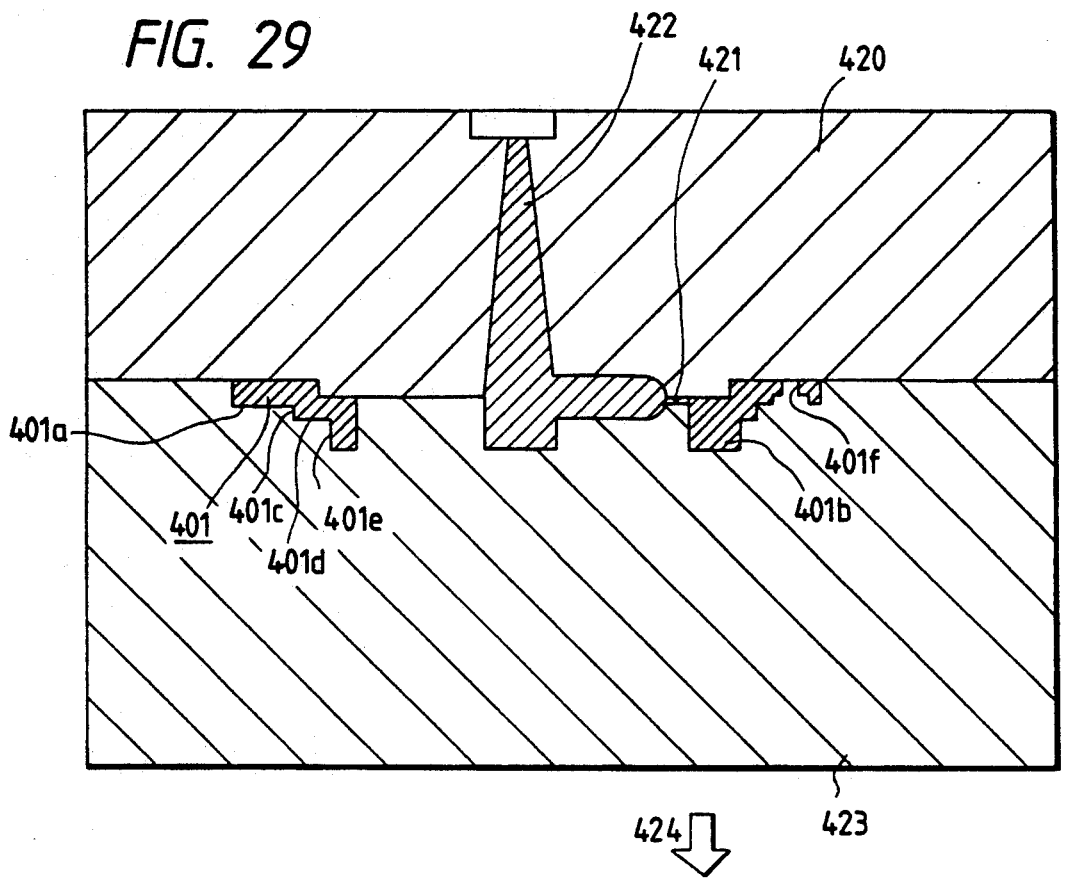
FIG. 29 is a cross-sectional view representing a mold structure for molding.

FIG. 29 shows a mold structure for molding the lens mount 401 shown in FIGS. 26 and 27.

As shown, the lens mount 401 as a molded article is molded by a movable mold plate 423 opened in the direction of arrow 424 relative to a fixed mold plate 420. The direction in which this movable mold plate 423 is opened is the direction of the optic axis to the lens mount 401 and no parting line lies in the mount sliding surface 401a and the fitting surface 401c in which the creation of burrs poses a problem and therefore, these surfaces are surfaces of high accuracy free of the creation of burrs. The reference numeral 421 designates a side gate, and the reference numeral 422 denotes a spool.

What is characteristic in this molding is that the mount pawl 401b can be molded by only the movable mold plate 423 opened in the direction of the optic axis and is made into a block member provided with an idle wall portion (in which the undercutting is eliminated) so that the portion to be secondarily cut may become smallest. If an attempt is made to provide an original bayonet pawl by molding, there will become a split mold in which only the area of the bayonet pawl slides (in a direction orthogonal to the optic axis). In that case, as a matter of course, parting lines will lie in the mount sliding surface and the fitting surface and thus, there will arise a problem of the creation of burrs.

In the present embodiment, preference is offered to the accuracy and quality of the mount sliding surface 401a and the fitting surface 401c, and with regard to the mount pawl, the actual pawl shape is provided later by cutting, whereby not only the accuracy and quality are ensured, but also the overall cost is made lower than when a split mold is used. Further, the parting lines are not exposed on the exterior of the mount and therefore, there can be provided a mount which is beautiful to look at.

Also, by making the portions, which provide the end portions after cutting, into the inclined surfaces 401h, 401i and 401j with the cutting of the mount pawl 401b being taken into account, the creation of burrs in these portions could be minimized. The amount of cutting is suppressed so as not to reach the level difference surface 401d and the cylinder portion 401e and thus, the cut surface itself is all hidden in the back of the bayonet pawl 401b' and made inconspicuous.

Also, the hole 401f for the mounting screw and the groove 401g for positioning could be formed easily and the degree of freedom of their locations could be made great.

Figure 30:
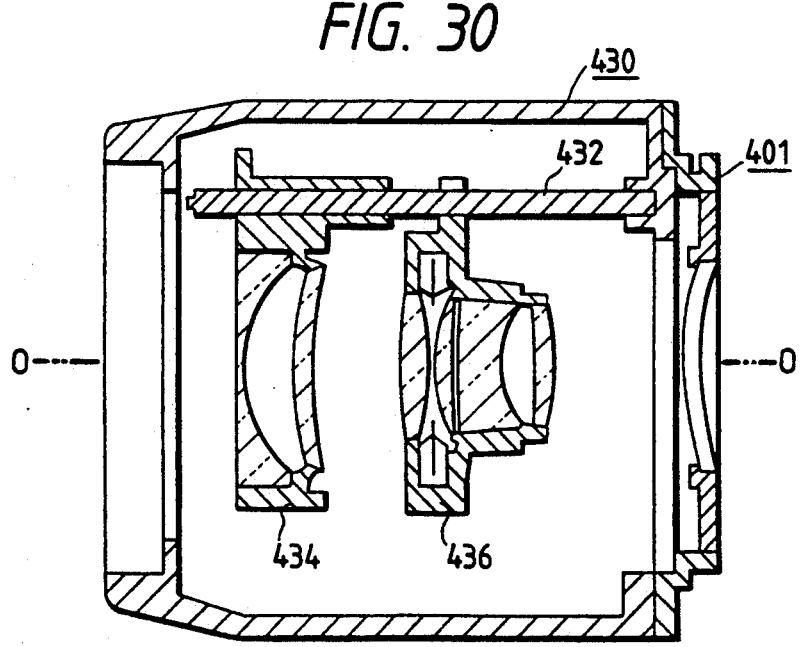
FIG. 30 is a cross-sectional view showing a lens mount as it is mounted on an interchangeable lens body.

FIG. 30 shows the above-described lens mount 401 as it is mounted on an interchangeable lens body 430 as an optical apparatus body.

In FIG. 30, the reference numeral 432 designates a guide bar by which a forward group lens frame 434 and a rearward group lens frame 436 are supported for movement in the direction of the optic axis. Line O—O indicates the optic axis.

The embodiment described above and shown in FIGS. 26-30 relates to an optical apparatus having a mount, and provides an optical apparatus in which a mount pawl is formed later by cutting when the mount is molded of plastic, whereby use is made of a mold structure of low cost which does not create burrs in the surface which provides the fiducial surface.

Figure 31:
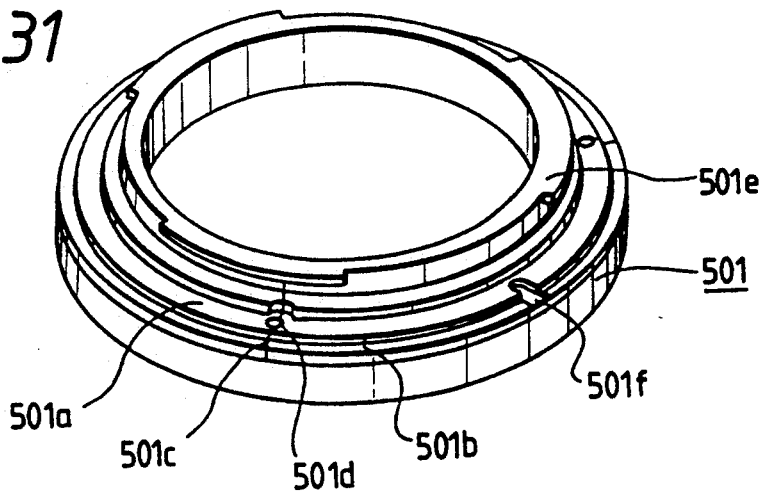
FIG. 31 is a perspective view of only a lens mount as an eleventh embodiment immediately after molding.
Figure 32:
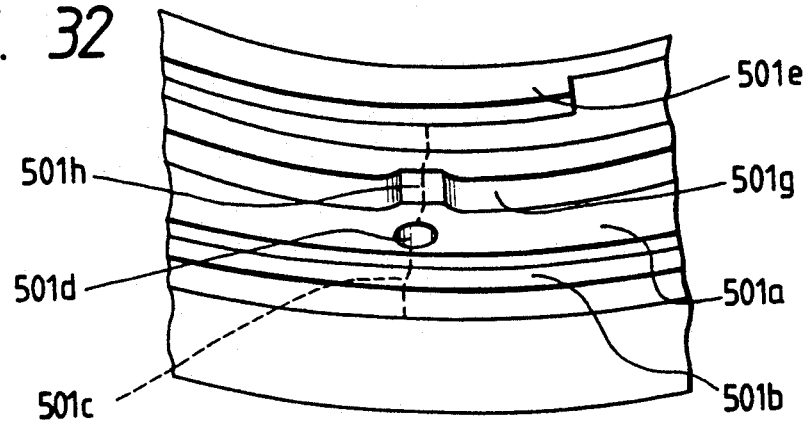
FIG. 32 is an enlarged view of the essential portions of FIG. 31.
Figure 33:
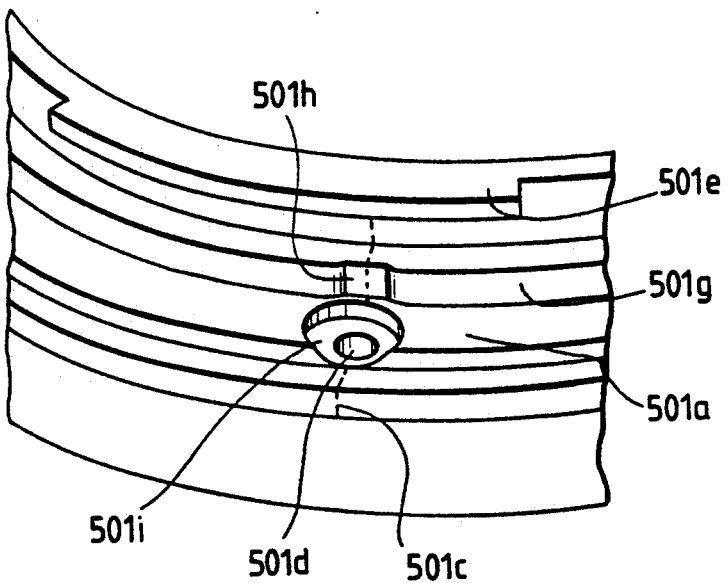
FIG. 33 is a perspective view showing a state in which spot facing has been done from the state of FIG. 32.

FIGS. 31 to 33 show an eleventh embodiment of the present invention. FIG. 31 is a perspective view of a lens mount of the bayonet type molded by the injection molding method, and FIG. 32 is an enlarged detailed view of the essential portions of the mount shown in FIG. 31 which are concerned with the present invention. The reference numeral 501 designates a lens mount, and the reference character 501a denotes a mount sliding surface which is the main sliding portion with respect to the partner side mount and which provides the fiducial surface in the direction of the optic axis. The reference character 501b designates a stepped portion slightly depressed in the direction of the optic axis relative to the mount sliding surface, the reference character 501c denotes a parting line which is the seam between molds, the reference character 501d designates a mount fixing screw hole, the reference character 501e denotes a mount pawl, the reference character 501f designates a groove for positioning the mount in the direction of rotation when the mount is mounted, and the reference character 501g denotes a level-difference-like fitting surface for ensuring the coaxiality with respect to the partner side mount. The fitting surface 501g provides the fiducial surface in the diametrical direction. The reference character 501h designates a depression in the parting line portion of the fitting surface 501g.

FIG. 33 shows the essential portions shown in FIG. 32 and a state in which spot facing has further been effected on the same portions. The reference character 501i denotes a spot facing portion in which the head of a screw inserted into the screw hole 501d is made into a large-diametered groove by spot facing.

In FIG. 32, the parting line in the fitting surface 501g is provided with the depression 501h so that it may be free from any actual damage even if burrs are created therein, and also the screw hole 501d is subjected to spot facing, whereby the parting line on the mount sliding surface 501a can be completely deleted from the mount sliding surface 501a as shown in FIG. 33. Accordingly, the parting line disappears from the conspicuous mount sliding surface on the exterior of the lens mount and thus, the lens mount is improved in its beauty and the creation of burrs or the like cannot adversely affect the optical performance of the lens mount.

The effects of the depression 501h in the fitting surface 501g are that even if burrs are created on the parting line 501c, catching will not be caused in the fitting operation when the mount is mounted on other apparatus, for example, a camera body, and any deviation of the center of the optic axis will not be caused.

Figure 34:
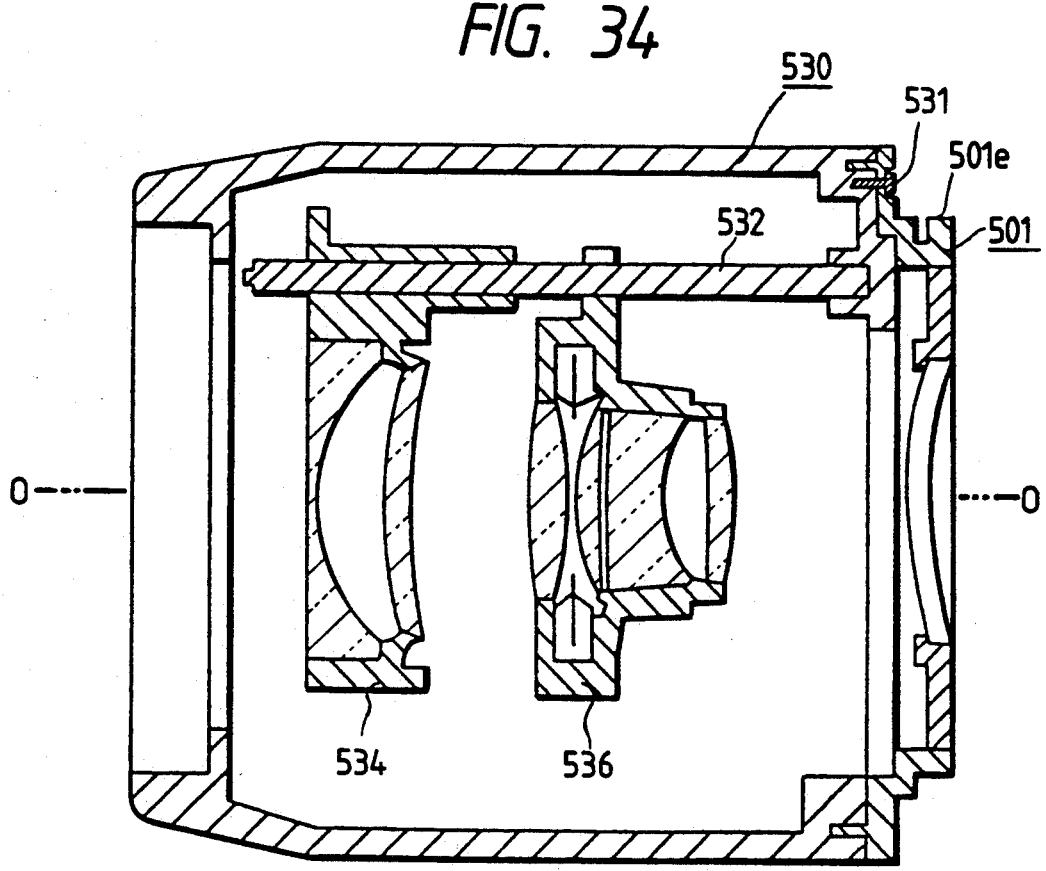
FIG. 34 is a cross-sectional view of the lens mount of FIG. 33 as it is fixed to an interchangeable lens body.

FIG. 34 shows the above-described lens mount 501 as it is assembled to an interchangeable lens body 530 as an optical apparatus body. In FIG. 34, the reference numeral 531 designates a mounting screw inserted in the screw hole 501d, and the reference numeral 532 denotes a guide bar by which a forward group lens frame 534 and a rearward group lens frame 536 are supported for movement in the direction of the optic axis. Line O—O indicates the optic axis.

Figure 35:
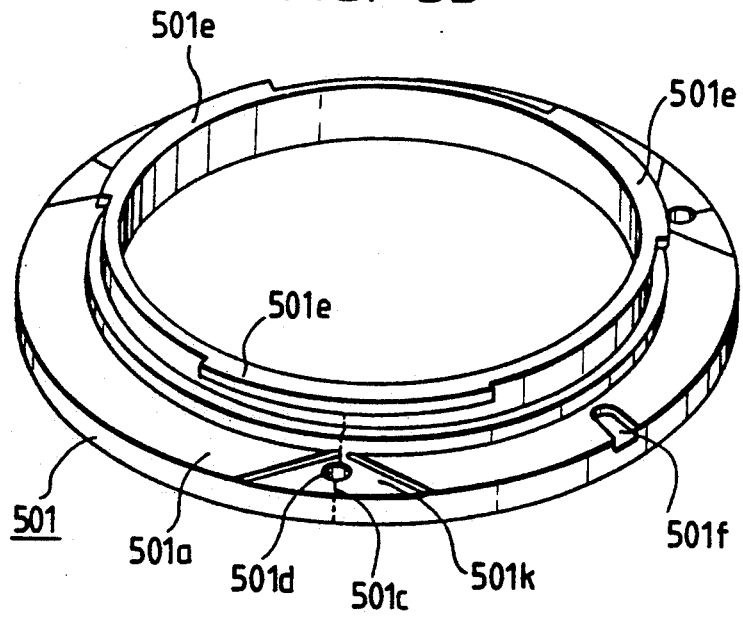
FIG. 35 is a perspective view of only a lens mount as a twelfth embodiment.
Figure 36:
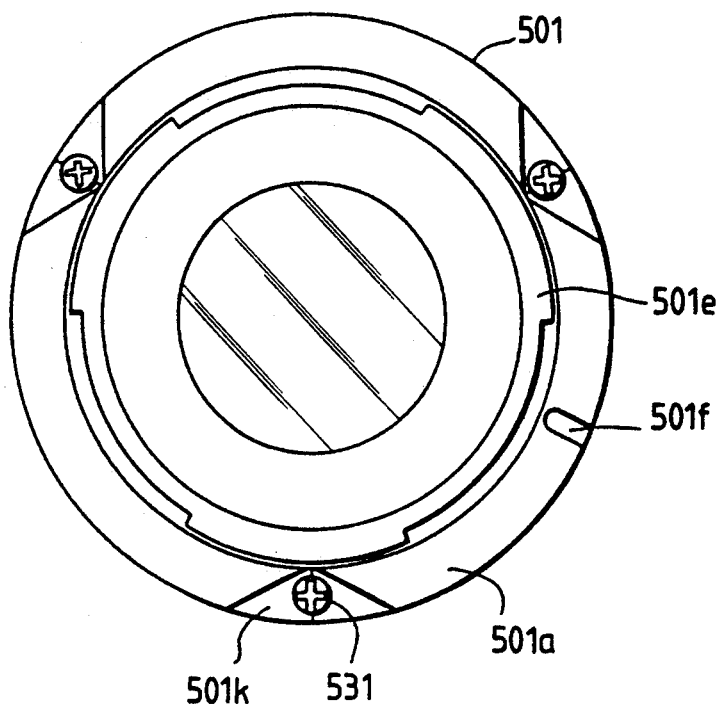
FIG. 36 is a front view of the lens mount of FIG. 35 as it is fixed to an interchangeable lens body.

A twelfth embodiment of the present invention will now be described with reference to FIGS. 35 and 36.

In the twelfth embodiment, a depression 501k is formed in an area including a parting line 501c in a mount sliding surface 501a. A mount fixing screw hole 501d is formed on the depression 501k and on the parting line 501c. In this twelfth embodiment, the depression 501k is formed on the parting line 501c to eliminate the influence of burrs or the like and further, the screw hole 501d is formed, whereby the parting line in the depression 501k becomes inconspicuous and thus, the beauty of the external appearance is enhanced. The amount of depression of the depression 501k may desirably be somewhat greater than the thickness of the head of a mounting screw 531.

Figure 37:
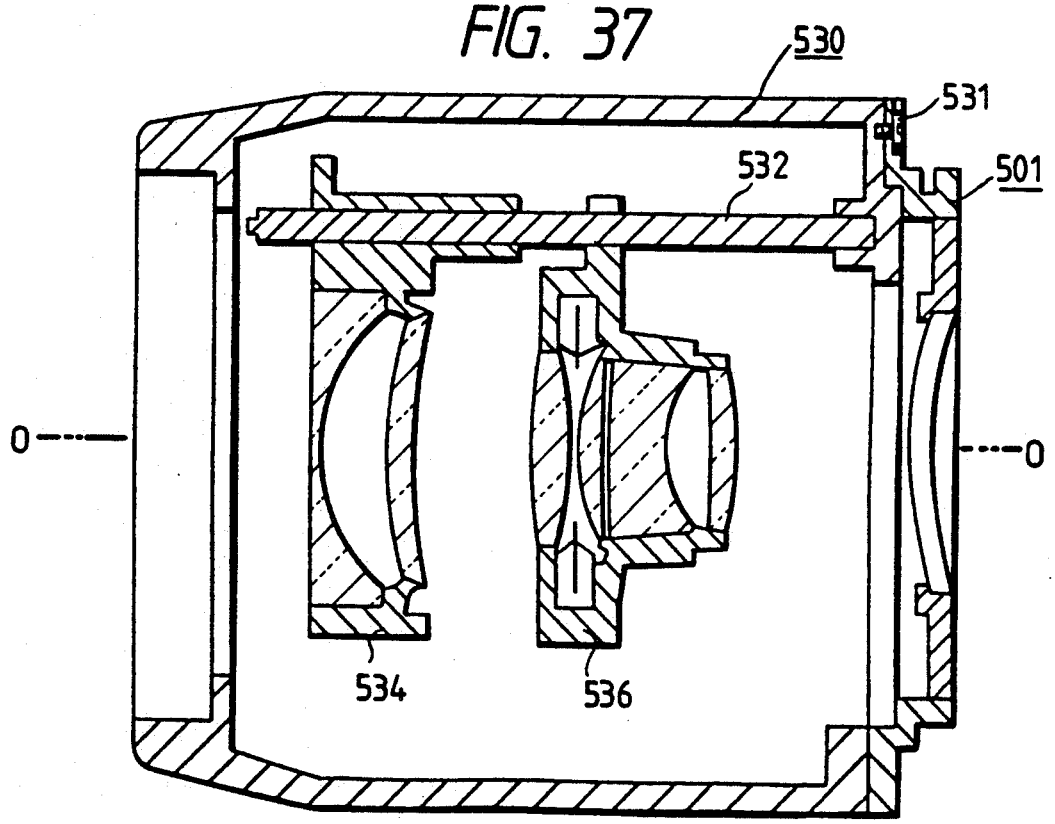
FIG. 37 is a cross-sectional view of the lens mount of FIG. 36.

FIG. 37 shows the lens mount of the twelfth embodiment as it is assembled to an interchangeable lens body 530 as an optical apparatus body. Each construction in FIG. 37 is similar to that in FIG. 34 and therefore need not be described.

Figure 38:
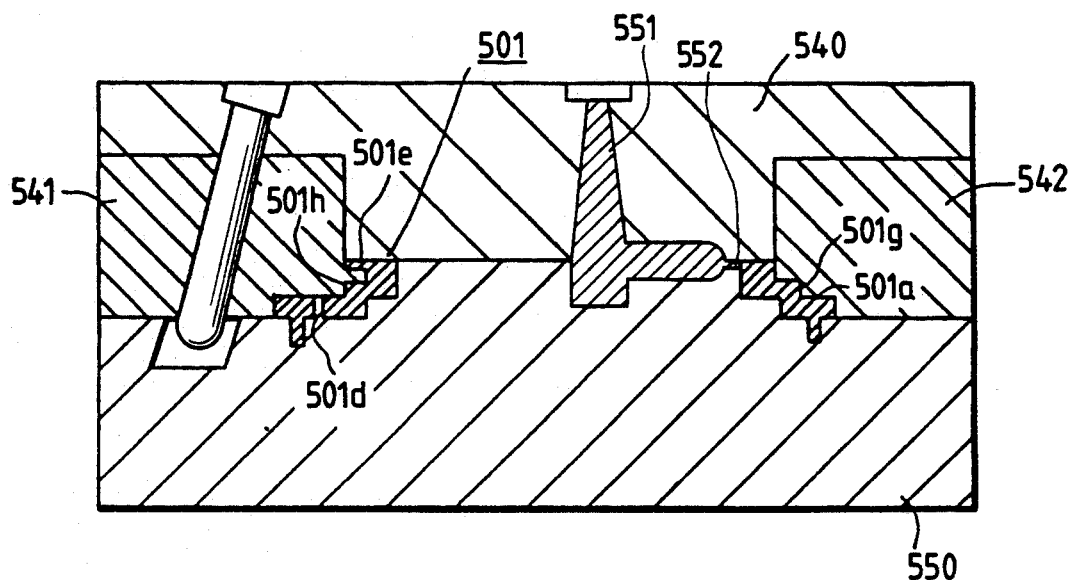
FIG. 38 is a cross-sectional view showing a mold structure when the lens mount of FIG. 31 is molded of plastic.

FIG. 38 shows a mold structure for molding the lens amount of the eleventh embodiment of plastic.

In FIG. 38, the reference numeral 540 designates a fixed mold plate, and the reference numerals 541, 542 and 543 denote slide cores (among which the slide core 543 is not seen in the figure). The peripheral surface including mount pawls 501e is molded by the three slide cores 541-543 disposed at intervals of 120° and therefore, the seam between adjacent slide cores provides a parting line. The slide cores 541-543 are moved in the diametrical direction (the direction orthogonal to the optic axis). The reference numeral 550 designates a movable mold plate, the reference numeral 551 denotes a spool, and the reference numeral 552 designates a side gate.

In the mold structure of FIG. 38, the screw hole 501d is integrally formed and only the spot facing 501i is machined. Alternatively, however, both the screw hole 501d and the spot facing 501i may be machined.

Figure 39:
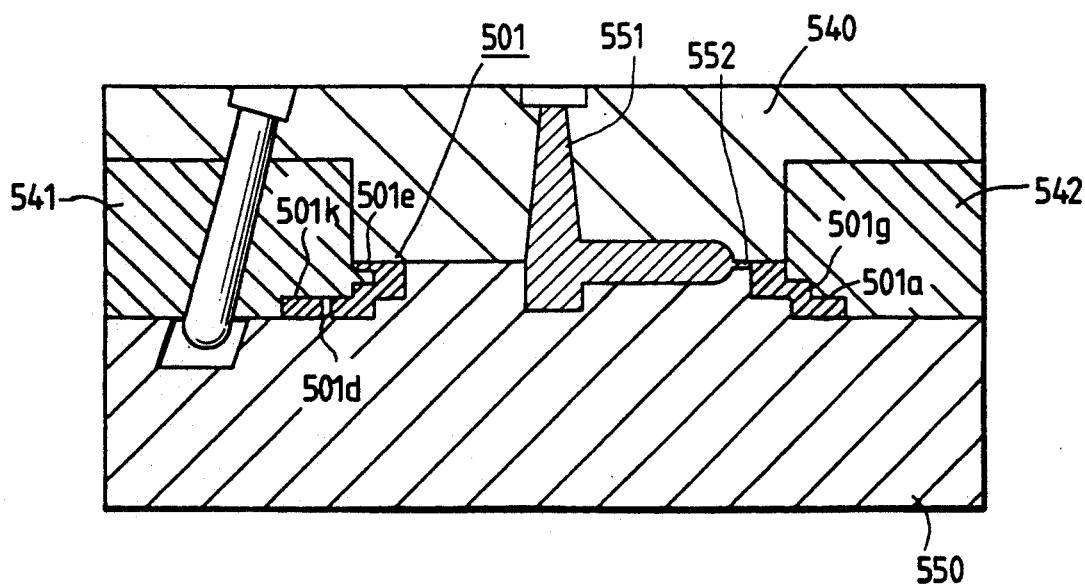
FIG. 39 is a cross-sectional view showing a mold structure when the lens mount of FIG. 35 is molded of plastic.

FIG. 39 shows a mold structure for molding the lens mount of the twelfth embodiment of plastic. The only difference of the mold structure of FIG. 39 from that of FIG. 38 is that the depression 501k is integrally molded, and the other constructions are common and therefore need not be described in detail.

In the embodiments shown in FIGS. 31-39, even where the parting lines during molding appear on the mount sliding surface, the screw hole is formed on the parting line, whereby there is provided an optical apparatus having a mount in which the adverse effect of burrs on the parting lines can be decreased without extra cost being required and the beauty of the external appearance can also be improved. Further, by the screw hole being subjected to spot facing, substantially all of the parting lines on the mount sliding surface can be deleted.

Also, even where the parting lines during molding appear on the fitting surface which provides the reference in the diametrical direction, depressions in the diametrical direction are formed on the parting lines, whereby there is provided an optical apparatus having a mount in which the adverse effect of burrs on the parting lines can be eliminated.

Also, even where the parting lines during molding appear on the mount sliding surface, depressions in the direction of the optic axis including the parting lines are formed and screw holes are formed on the parting lines, whereby there is provided an optical apparatus having a mount in which the adverse effect of burrs on the parting lines can be eliminated without extra cost being required and the beauty of the external appearance can also be improved.

Figure 40:
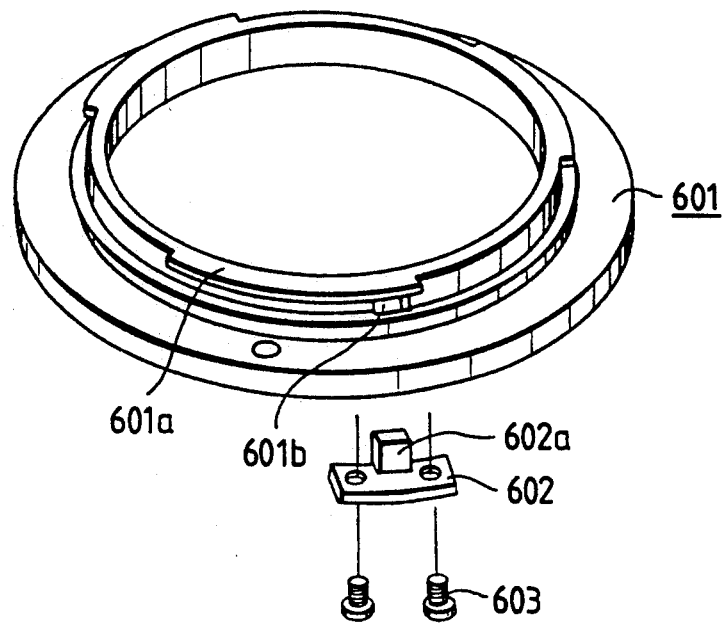
FIG. 40 is a perspective view of a mount as a thirteenth embodiment.

FIG. 40 shows a thirteenth embodiment of the present invention. In FIG. 40, the reference numeral 601 designates a plastic mount, the reference character 601a denotes the bayonet pawl of the mount 601, the reference character 601b designates a slot formed in the mount 601 along the direction of the optic axis and seen as a hole appearing under the bayonet pawl 601a, and the reference numeral 602 denotes a stopper die for limiting the rotation of the mount 601 when it is mounted. The stopper die 602 is made of a metal. The reference character 602a designates a stopper pawl protruding from the stopper die 602 and fitting into the slot 601b and providing a stopper, and the reference numeral 603 denotes a screw for fixing the stopper die 602 to the mount 601.

Figure 41:
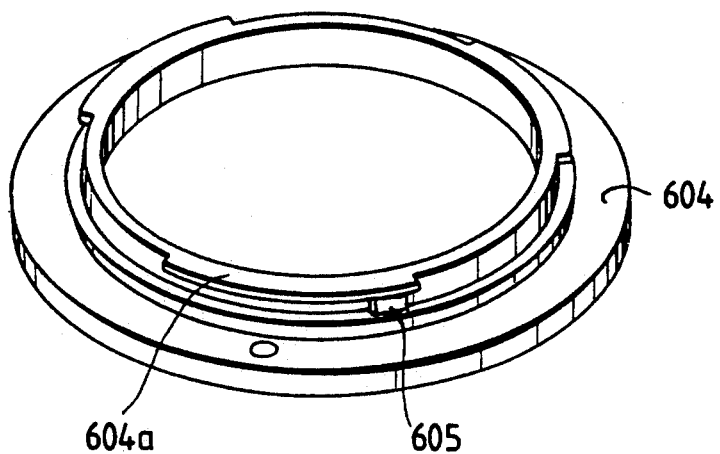
FIG. 41 is a perspective view of a mount as a fourteenth embodiment.
Figure 42:
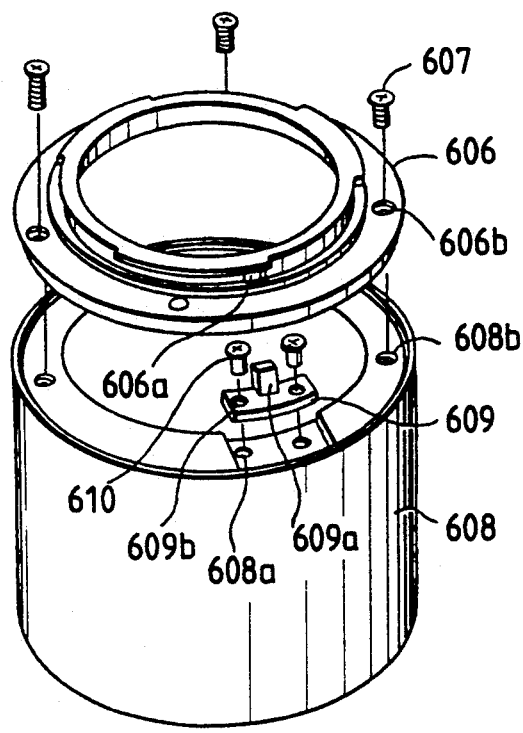
FIG. 42 is a perspective view of an interchangeable lens as a fifteenth embodiment.

FIG. 41 is a perspective view of a plastic mount according to a fourteenth embodiment of the present invention. In FIG. 41, the reference numeral 604 designates a plastic mount, the reference character 604a denotes a bayonet pawl, and the reference numeral 605 designates a mount rotation stopper insert-molded in the mount 604 and formed of a metal material. FIG. 42 is a perspective view showing a fifteenth embodiment of the present invention. In FIG. 42, the reference numeral 606 denotes a plastic mount, the reference character 606a designates a slot formed in the mount 606 along the direction of the optic axis, the reference character 606b denotes a screw hole for mounting the mount 601 on an interchangeable lens body 608 as an optical apparatus body, the reference numeral 607 designates a screw, the reference numeral 609 denotes a mount rotation stopper die made of a metal which is mounted on the interchangeable lens body 608, the reference character 609a designates a stopper pawl protruding from the stopper die 609, the reference character 609b denotes a screw hole for mounting the stopper die 609 on the interchangeable lens body 608, the reference character 608a designates a screw hole for mounting the stopper die 609, the reference character 608b denotes a screw hole for mounting the mount 606, and the reference numeral 610 designates a screw. In FIG. 42, when the stopper die 609 is fixed to the interchangeable lens body 608 and the mount 606 is mounted on the interchangeable lens body 608, the stopper pawl 609a fits into the slot 606a in the mount 606 and functions as a rotation stopper when the mount 606 is mounted or dismounted.

Figure 43:
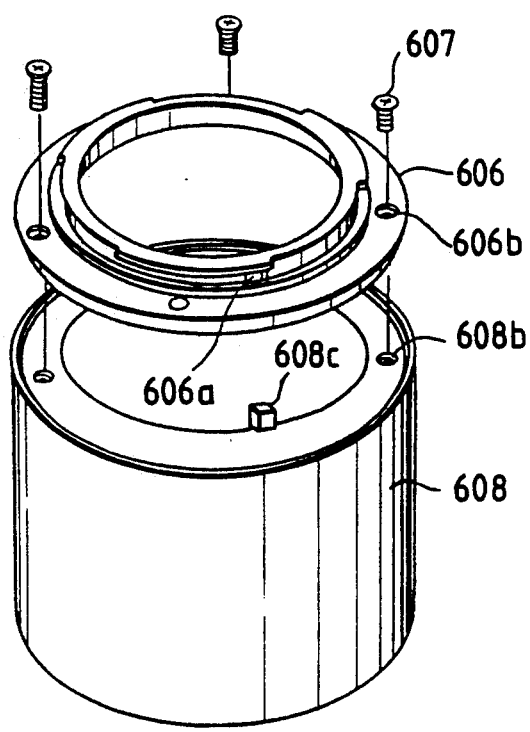
FIG. 43 is a perspective view of an interchangeable lens as a sixteenth embodiment.

FIG. 43 is a perspective view showing a sixteenth embodiment of the present invention. The difference of this embodiment from the fifteenth embodiment is that a stopper pawl 608c is molded of plastic integrally with a part which constitutes an interchangeable lens body 608. The part having this stopper pawl 608c is molded of a plastic material which attaches importance to strength.

As described above, in the embodiments of FIGS. 40-43, with regard to the mount molded of plastic, the rotation stopper which serves during mounting and dismounting is made of a discrete material and combined with the plastic mount, whereby the range of utilization of the plastic mount can be enlarged and the solution to the insufficient strength during the mounting and dismounting of the mount is also made possible. The stopper made discretely can be inexpensively manufactured by the press working of a metallic plate or the die casting method and the header working, and of course, the plastic mount can be manufactured at a remarkably low cost as compared with the conventional metallic mount.

What is claimed is:

1. An optical apparatus having a mount molded of plastic, said optical apparatus comprising:
   a mount sliding surface formed on said mount and providing a fiducial surface in the direction of an optical axis;
   an optical element disposed on the optical axis; and
   a depression formed in an area surrounding a parting line during molding on said mount sliding surface.

2. An optical apparatus according to claim 1, wherein said mount is a bayonet mount, and said parting line is made to coincide with an end of a bayonet pawl in a direction around said optical axis and said depression is formed at said end of said bayonet pawl.

3. An optical apparatus according to claim 1, wherein said mount is a bayonet mount, and at least a bayonet pawl is integrally molded with said mount by a mold sliding in a diametrical direction, whereby said parting line is created diametrically of said mount sliding surface to coincide with an end of said bayonet pawl in a direction around said optical axis, and said depression is formed so as to include said parting line.

4. An optical apparatus according to claim 1, wherein an end edge of said depression is an inclined surface.

5. An optical apparatus according to claim 1, which is a camera body.

6. An optical apparatus according to claim 1, which is an interchangeable lens.

7. An optical apparatus having a mount molded of said plastic, said optical apparatus comprising:
   a peripheral surface formed on said mount and providing a fiducial surface in the direction of an optical axis;
   an optical element disposed on the optical axis; and
   a depression formed in an area surrounding a parting line during molding on said peripheral surface.

8. An optical apparatus according to claim 7, wherein said mount is a bayonet mount, and at least a bayonet pawl is integrally molded with said mount by a mold sliding in a diametrical direction, whereby said parting line is created diametrically of said mount in said peripheral surface, and said depression is formed so as to include said parting line.

9. An optical apparatus according to claim 7, wherein said mount is a bayonet mount, and said parting line is disposed interiorly of ends of a bayonet pawl of said mount.

10. An optical apparatus according to claim 7, which is an interchangeable lens.

11. An optical apparatus having a rotative mount molded of plastic, said optical apparatus comprising:
a bayonet pawl molded integrally with said mount when said mount is molded;
a bridge portion molded at an end of said bayonet pawl integrally therewith in a direction around an optical axis; and
an optical element disposed on the optical axis.

12. An optical apparatus according to claim 11, wherein a portion of said bridge portion which is off the area of said bayonet pawl is formed into a tapered shape.

13. An optical apparatus according to claim 11, which is an interchangeable lens.

14. An optical apparatus having a mount molded of plastic, said optical apparatus comprising:
a cylinder portion extending from said mount in the direction of an optical axis and molded integrally with said mount to reinforce said mount;
said mount being fixed to a body of said optical apparatus;
wherein the fixing of said mount to the body of said optical apparatus is accomplished by screw-setting said cylinder portion in a direction orthogonal to the optical axis; and
an optical element disposed on the optical axis.

15. An optical apparatus according to claim 14, wherein the screw-set position of said cylinder portion is interiorly of opposed ends of a bayonet pawl of said mount.

16. An optical apparatus according to claim 14, which is an interchangeable lens.

17. An optical apparatus according to claim 14, wherein said cylinder portion is disposed near an outer diameter of said mount.

18. An optical apparatus having a mount molded of plastic, said optical apparatus comprising:
a cylinder portion extending from said mount in the direction of an optical axis and molded integrally with said mount;
said mount being fixed to a body of said optical apparatus by screw-setting said cylinder portion in a direction orthogonal to the optical axis; and
an optical lens held by said cylinder portion.

19. An optical apparatus according to claim 18, which is an interchangeable lens.

20. An optical apparatus according to claim 18, wherein said cylinder portion is disposed near an inner diameter of said mount.

21. An optical apparatus having a mount molded of plastic, said optical apparatus comprising:
first and second cylinder portions extending from said mount in the direction of an optical axis and molded integrally with said mount to reinforce said mount, said first cylinder portion being disposed near an outer diameter of said mount, said second cylinder portion being disposed near an inner diameter of said mount;
said mount being fixed to a body of said optical apparatus; and
an optical element disposed on the optical axis.

22. An optical apparatus according to claim 21, which is an interchangeable lens.

23. An optical apparatus according to claim 21, wherein a fixing of said mount to the body of said optical apparatus is accomplished by screw-setting said first cylinder portion in a direction orthogonal to the optical axis.

24. An optical apparatus according to claim 23, further comprising:
an optical lens held by said second cylinder portion.

25. An optical apparatus having a mounted of plastic, said optical apparatus comprising:
a mount sliding surface formed on said mount and providing a fiducial surface in the direction of an optical axis;
an optical element disposed on the optical axis; and
a screw hole for fixing said mount to a body of said optical apparatus, said screw hole being formed on a parting line during molding on said mount sliding surface.

26. An optical apparatus according to claim 25, wherein said screw hole includes spot facing, and said parting line on said mount sliding surface is substantially deleted by said spot facing.

27. An optical apparatus according to claim 25, which is an interchangeable lens.

28. An optical apparatus having a mount molded of plastic, said optical apparatus comprising:
a mount sliding surface formed on said mount and providing a fiducial surface in the direction of an optical axis;
an optical element disposed on the optical axis;
a depression formed on a parting line during molding on said mount sliding surface; and
a screw hole formed in said depression for fixing said mount to a body of said optical apparatus.

29. An optical apparatus according to claim 28, wherein said mount includes a bayonet pawl and wherein said depression is disposed in an area of said bayonet pawl.

30. An optical apparatus according to claim 28, which is an interchangeable lens.

31. An optical apparatus having a rotative mount molded of plastic, said optical apparatus comprising:
a stopper for regulating the range of rotation of said mount, said stopper being formed by a discrete member and located at an end portion of a bayonet pawl positioned on said mount;
said mount being fixed to a body of said optical apparatus; and
an optical element disposed in the direction of an optical axis.

32. An optical apparatus according to claim 31, wherein said stopper is insert-molded in said mount.

33. An optical apparatus according to claim 31, wherein said stopper is positioned on said mount when said stopper is mounted on the body of said optical apparatus.

34. An optical apparatus according to claim 31, which is an interchangeable lens.

35. An optical apparatus according to claim 31, wherein said end portion of said bayonet pawl on said mount is formed with a hole through which a stopper portion of said stopper protrudes.

* * * * *